(12) United States Patent
Kim et al.

(10) Patent No.: US 8,796,185 B2
(45) Date of Patent: Aug. 5, 2014

(54) SELF-ASSEMBLING HIGH DENSITY ORDERED PATTERNED BIOMOLECULE ARRAY AND METHOD FOR MAKING AND USING THE SAME

(75) Inventors: Dae Hyun Kim, Santa Clara, CA (US); Sungjoon Kim, Cupertino, CA (US)

(73) Assignee: Lightspeed Genomics, Inc., Santa Clara, CA (US)

( * ) Notice: Subject to any disclaimer, the term of this patent is extended or adjusted under 35 U.S.C. 154(b) by 0 days.

(21) Appl. No.: 13/415,787

(22) Filed: Mar. 8, 2012

(65) Prior Publication Data
US 2012/0231974 A1    Sep. 13, 2012

Related U.S. Application Data

(60) Provisional application No. 61/450,568, filed on Mar. 8, 2011.

(51) Int. Cl.
*C40B 40/04*    (2006.01)
(52) U.S. Cl.
USPC ........................................................... 506/15

(58) Field of Classification Search
None
See application file for complete search history.

(56) References Cited

U.S. PATENT DOCUMENTS

| 8,563,240 B2 | 10/2013 | Su et al. |
| 2009/0270273 A1 | 10/2009 | Burns et al. |
| 2009/0325819 A1 | 12/2009 | Gao et al. |

OTHER PUBLICATIONS

Hatch et al. (1999) "Rolling circle amplification of DNA immobilized on solid surfaces and its application to multiplex mutation detection" Genetic Analysis: Biomolecular Engineering 15(2):35-40.*
PCT International Search Report and Written Opinion, PCT Application No. PCT/US2012/028363, Jun. 4, 2012, nine pages.

* cited by examiner

*Primary Examiner* — Tracy Vivlemore
*Assistant Examiner* — Karen S Weiler
(74) *Attorney, Agent, or Firm* — Fenwick & West LLP

(57) ABSTRACT

A method for fabricating a universal substrate for attaching biomolecules, including sequencing features and the resulting substrate. A method of direct detection of analytes utilizes a Complementary Metal Oxide Semiconductor (CMOS) sensor with the substrate.

18 Claims, 16 Drawing Sheets

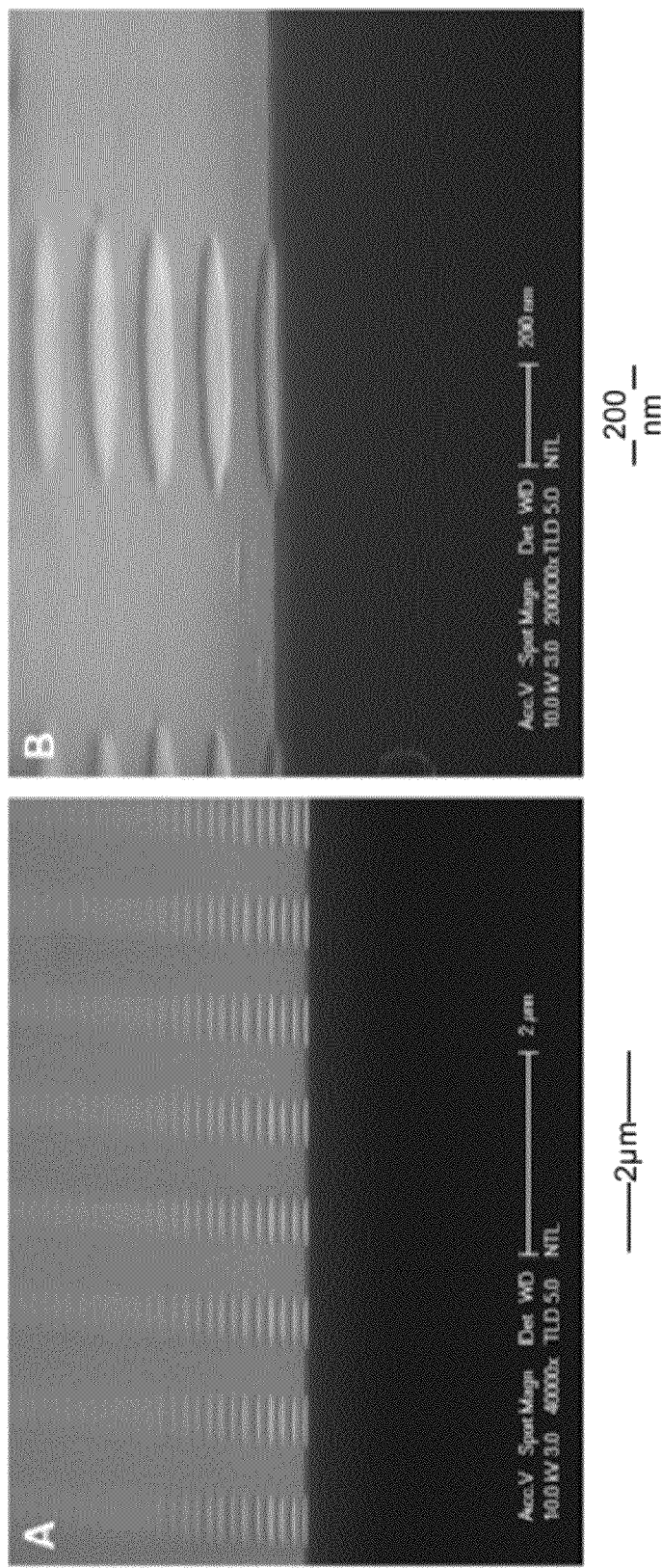
FIG. 2A-B

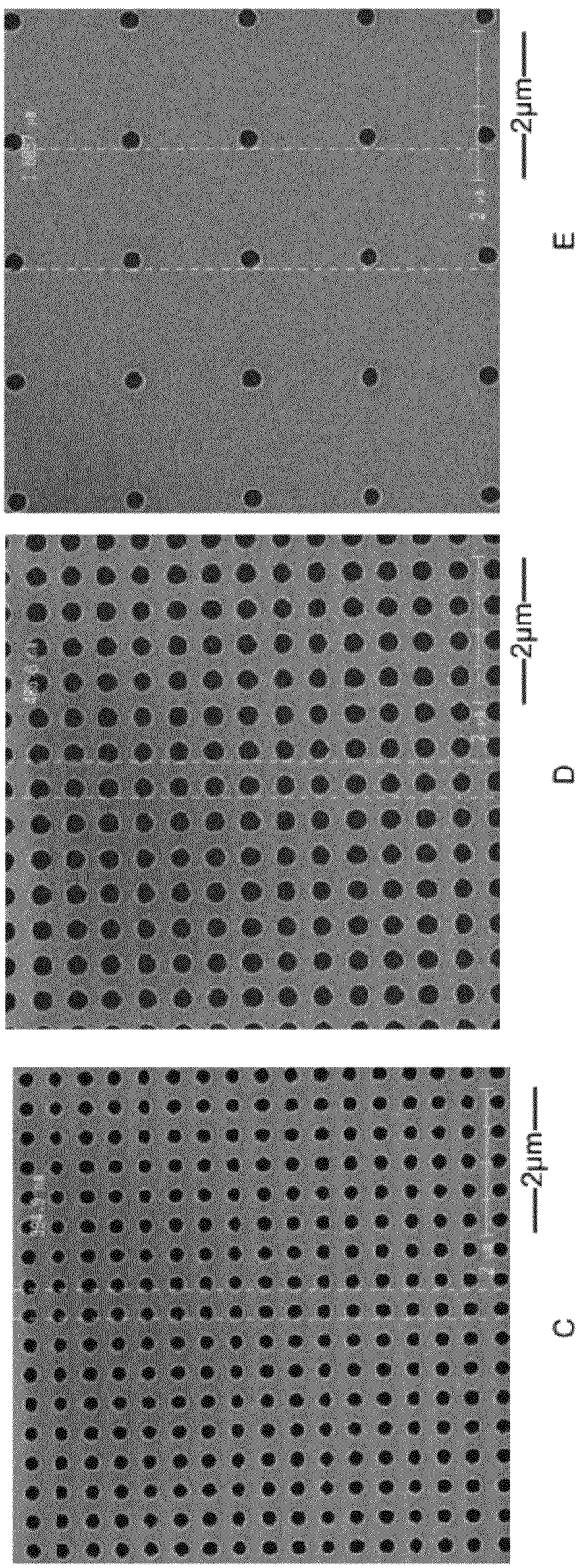
FIG. 2C-E

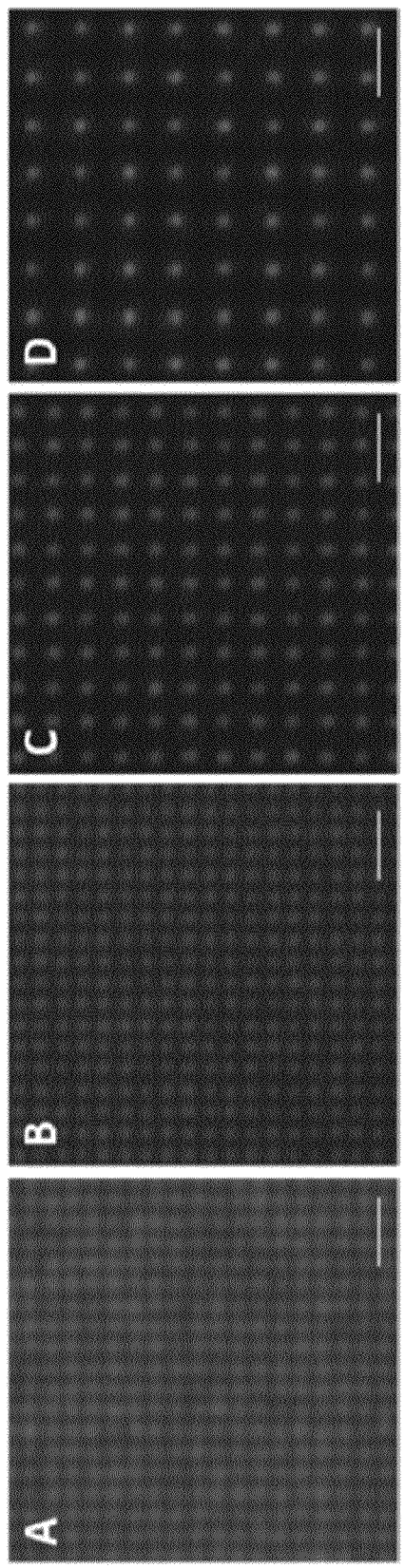
FIG. 3A-D

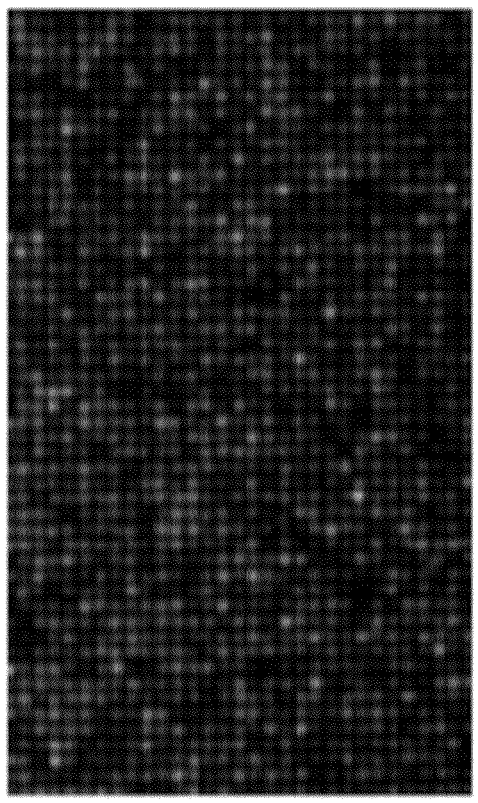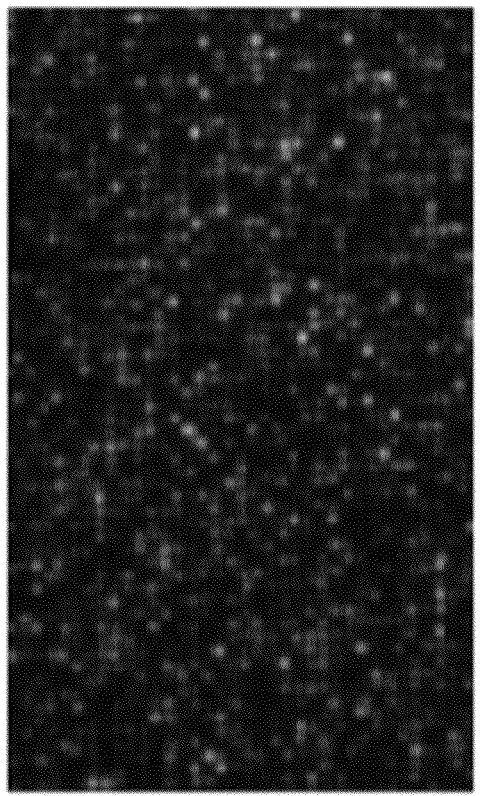
FIG. 7

SEQUENCE LISTING

<160> NUMBER OF SEQ ID NOS: 11

<210> SEQ ID NO 1
<211> LENGTH: 78
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: 5'-phosphate
<220> FEATURE:
<221> NAME/KEY: modified_base
<222> LOCATION: (13)..(69)
<223> OTHER INFORMATION: a, c, t, g, unknown or other

<400> SEQUENCE: 1
gttcctcatt ctnnnnnnnn nnnnnnnnnn nnnnnnnnnn nnnnnnnnnn     60
nnnnnnnnnc tgccccgg                                        78

<210> SEQ ID NO 2
<211> LENGTH: 27
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: 5'-NH2

<400> SEQUENCE: 2 tttttttagaa tgaggaaccc ggggcag                             27

<210> SEQ ID NO 3
<211> LENGTH: 27
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: Description of Combined DNA/RNA Molecule:
      Synthetic oligonucleotide
<220> FEATURE:
<223> OTHER INFORMATION: 5'-Cy3

<400> SEQUENCE: 3 tttttttcugc cccgggutcc tcautct                             27

<210> SEQ ID NO 4
<211> LENGTH: 21
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Description of Combined DNA/RNA Molecule:
      Synthetic primer
<220> FEATURE:
<223> OTHER INFORMATION: 5'-phosphate

<400> SEQUENCE: 4
cugccccggg utcctcautc t                                    21

<210> SEQ ID NO 5
<211> LENGTH: 127
<212> TYPE: DNA
<213> ORGANISM: Artificial Sequence

```
<220> FEATURE:
<223> OTHER INFORMATION: Description of Artificial Sequence: Synthetic
      polynucleotide
<220> FEATURE:
<221> NAME/KEY: modified_base
<222> LOCATION: (35)..(69)
<223> OTHER INFORMATION: a, c, t, g, unknown or other

<400> SEQUENCE: 5
caagcagaag acggcatacg agctcttccg atctnnnnnn nnnnnnnnnn nnnnnnnnnn    60
nnnnnnnnna gatcggaaga gcgtcgtgta gggaaagagt gtagatctcg gtggtcgccg   120
tatcatt                                                             127

<210> SEQ ID NO 6
<211> LENGTH: 30
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: 5'-NH2

<400> SEQUENCE: 6 tttttttaatg atacggcgac caccgagatc                                    30

<210> SEQ ID NO 7
<211> LENGTH: 27
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: Description of Combined DNA/RNA Molecule:
      Synthetic primer
<220> FEATURE:
<223> OTHER INFORMATION: 5'-NH2

<400> SEQUENCE: 7 tttttttcaag cagaagacgg cauacga                                       27

<210> SEQ ID NO 8
<211> LENGTH: 62
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (5)..(38)
<223> OTHER INFORMATION: a, c, t, g, unknown or other

<400> SEQUENCE: 8
agctnnnnnn nnnnnnnnnn nnnnnnnnnn nnnnnnnga tctcggtggt cgccgtatca    60
tt                                                                   62

<210> SEQ ID NO 9
<211> LENGTH: 59
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (5)..(38)
```

-continued

```
<223> OTHER INFORMATION: a, c, t, g, unknown or other

<400> SEQUENCE: 9
agctnnnnnn nnnnnnnnnn nnnnnnnnnn nnnnnnnaa aaaaaaaaaa aaaaaaaa         59

<210> SEQ ID NO 10
<211> LENGTH: 30
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: 5'-NH2
<220> FEATURE:
<221> NAME/KEY: modified_base
<222> LOCATION: (9)..(9)
<223> OTHER INFORMATION: Locked nucleic acid
<220> FEATURE:
<221> NAME/KEY: modified_base
<222> LOCATION: (15)..(15)
<223> OTHER INFORMATION: Locked nucleic acid
<220> FEATURE:
<221> NAME/KEY: modified_base
<222> LOCATION: (19)..(19)
<223> OTHER INFORMATION: Locked nucleic acid
<220> FEATURE:
<221> NAME/KEY: modified_base
<222> LOCATION: (26)..(26)
<223> OTHER INFORMATION: Locked nucleic acid

<400> SEQUENCE: 10 tttttttaatg atacggcgac caccgagatc                                      30

<210> SEQ ID NO 11
<211> LENGTH: 30
<212> TYPE: DNA
<213> ORGANISM: Artificial Sequence
<220> FEATURE:
<223> OTHER INFORMATION: Description of Artificial Sequence: Synthetic
      primer
<220> FEATURE:
<223> OTHER INFORMATION: 5'-NH2
<220> FEATURE:
<221> NAME/KEY: modified_base
<222> LOCATION: (5)..(5)
<223> OTHER INFORMATION: Locked nucleic acid
<220> FEATURE:
<221> NAME/KEY: modified_base
<222> LOCATION: (10)..(10)
<223> OTHER INFORMATION: Locked nucleic acid
<220> FEATURE:
<221> NAME/KEY: modified_base
<222> LOCATION: (18)..(18)
<223> OTHER INFORMATION: Locked nucleic acid
<220> FEATURE:
<221> NAME/KEY: modified_base
<222> LOCATION: (25)..(25)
<223> OTHER INFORMATION: Locked nucleic acid

<400> SEQUENCE: 11
tttttttttt tttttttttt tttttttttt                                       30
```

SELF-ASSEMBLING HIGH DENSITY ORDERED PATTERNED BIOMOLECULE ARRAY AND METHOD FOR MAKING AND USING THE SAME

RELATED APPLICATIONS

This application claims the benefit of the filing date of earlier filed U.S. Application 61/450,568 filed Mar. 8, 2011 which is hereby incorporated by reference in its entirety.

SEQUENCE LISTING

The instant application contains a Sequence Listing which has been submitted in ASCII format via EFS-Web and is hereby incorporated by reference in its entirety. Said ASCII copy, created on Apr. 2, 2012, is named 20629US_CRF_sequencelisting.txt and is 4,603 bytes in size.

BACKGROUND

The sequencing throughput and cost of next generation sequencing is largely based on how many individual sequencing features (array) are available in a given imaging chamber (flow-cell) and how fast those features can be imaged as it proceeds through many cycles of sequencing reactions. The characteristic of a sequencing array must be carefully designed and closely correlated with the imaging system to maximally collect high quality data points from the imaged array. For example, given an imaging system's performance specification, the sequencing array has to be constructed with control of its feature size, spacing, and whether the features can be arranged randomly or in an ordered fashion. Theoretically, to maximize the number of features per given area for imaging, one would reduce the feature size to the imager's allowable limit and "pack" the features in a manner where individual features are still well resolved. To this end, an ordered array, which allows higher "pack" density compared to a random array, with small feature size and spacing enables further reduction in sequencing cost while increasing the sequencing throughput.

Light based optical imaging is one the most common methods to detect biological or chemical events. The ability to detect and analyze specific biological or chemical events in a high-throughput manner is highly sought after in fields such as DNA/RNA sequencing, molecular diagnostic, compound screening, etc. In these particular high-throughput applications, the imaging is performed not to necessarily reveal the physical details of an object, but to determine whether a certain event occurred or not from the object or whether a particular sequence is present or absent. With this type of imaging, the throughput largely depends on how many of these events a system can detect per unit time and therefore it is most advantageous to have as many objects detected as possible per image and at the same time be able to perform unit imaging at the shortest amount of time. There continues to be a need for detection and analysis done at lower cost with lower cost instruments and relatively simple sample preparation.

SUMMARY

The present disclosure provides a patterned substrate comprising a plurality of first regions and a second region wherein the plurality of first regions have a density on the substrate between $5 \times 10^6$ and $25 \times 10^6/mm^2$ or between $6 \times 10^6$ and $10 \times 10^6/mm^2$ and an associated biomolecule specifically located at said plurality of first regions. Examples of associated biomolecules include polynucleotides and polypeptides. In some aspects a polymer is attached to the first region. In some embodiments, the substrate is silicon or quartz. The substrate optionally comprises a Complementary Metal Oxide Semiconductor (CMOS) sensor. In some embodiments each of the plurality of first regions are coupled to an individual CMOS pixel.

Also provided is a method for building the patterned substrate comprising providing a substrate; etching a plurality of wells onto the substrate at a density of between $5 \times 10^6$ and $25 \times 10^6/mm^2$ or between $6 \times 10^6$ and $10 \times 10^6/mm^2$; coating the plurality of wells with a first coating; and associating a biomolecule to the plurality of wells. In some embodiments, the biomolecule is a polynucleotide. In one embodiment, associating a polynucleotide to a well comprises: attaching a universal primer to the plurality of wells; hybridizing a circular DNA template onto the universal primer; and performing solid-phase rolling circle amplification. In an alternate embodiment, associating a polynucleotide to a well comprises: attaching universal forward and reverse primers to each of the plurality of wells; hybridizing DNA template onto one of the forward or reverse primer; and performing solid-phase bridge amplification. In yet another alternative, associating a single polynucleotide to a well comprises: attaching universal primer to each of the plurality of wells; and hybridizing the polynucleotide comprising a single DNA template to the universal primer.

BRIEF DESCRIPTION OF THE DRAWINGS

FIG. 2 A-E are Scanning Electron Microscope images of the fabricated arrays.

FIG. 3A-D are fluorescent images of patterned substrates after attachment of dye molecules.

FIG. 7 are fluorescence images of ordered sequencing arrays prepared using methods 1 and 2.

DETAILED DESCRIPTION

Figure 1:
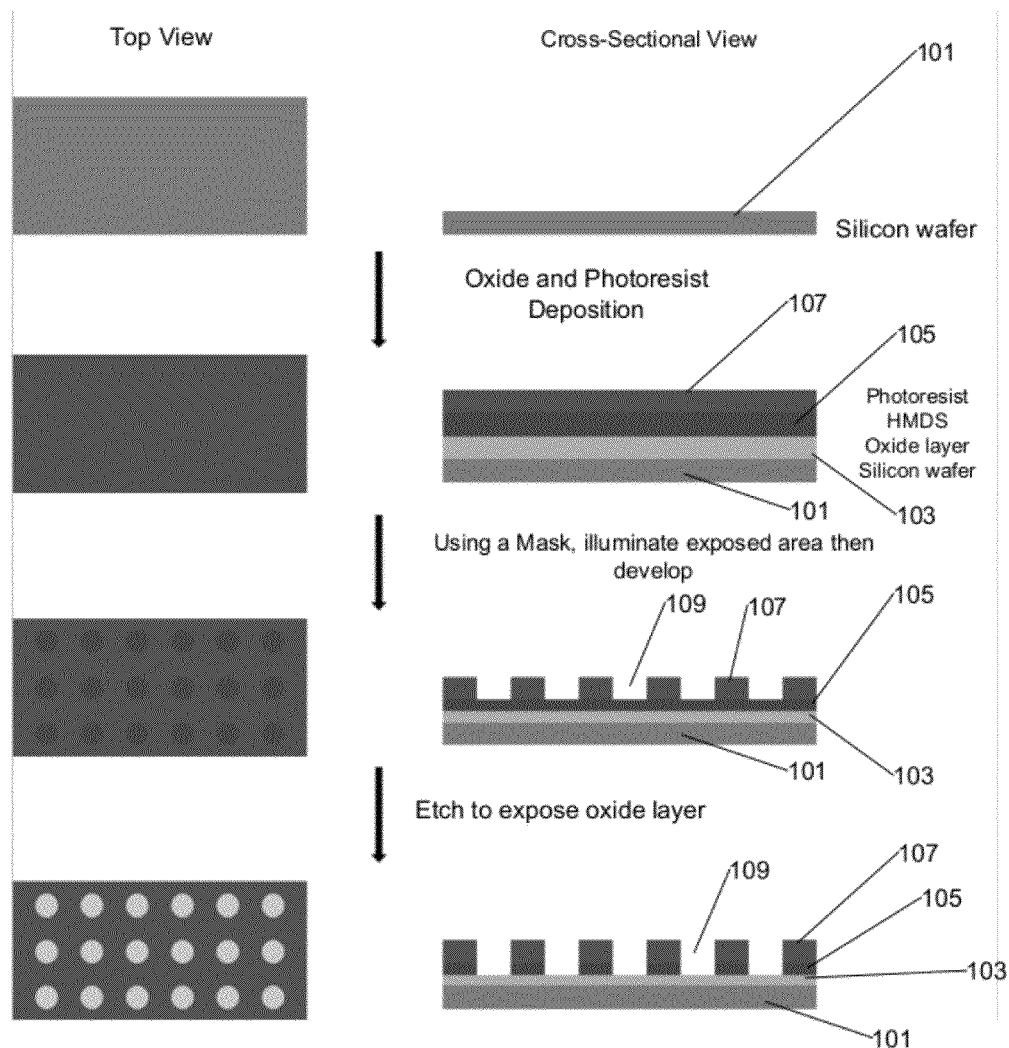
FIG. 1 is a schematic description of the fabrication of the substrate.

The following explanations of terms and methods are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The term "polypeptide" encompasses both naturally-occurring and non-naturally-occurring proteins, and fragments, mutants, derivatives and analogs thereof. A polypeptide may be monomeric or polymeric. Further, a polypeptide may comprise a number of different domains each of which has one or more distinct activities.

The term "polynucleotide" refers to a polymeric form of nucleotides of at least 3 bases in length. The term includes DNA molecules (e.g., cDNA or genomic or synthetic DNA) and RNA molecules (e.g., mRNA or synthetic RNA), as well as analogs of DNA or RNA containing non-natural nucleotide analogs, non-native inter-nucleoside bonds, or both. The nucleic acid can be in any topological conformation. For instance, the nucleic acid can be single-stranded, double-stranded, triple-stranded, quadruplexed, partially double-stranded, branched, hair-pinned, circular, or in a padlocked conformation. If single stranded, the nucleic acid molecule can be the sense strand or the antisense strand. "Polynucleotides" includes nucleotides which are not naturally occurring.

Overview

A solid substrate is constructed to which an ultra-dense ordered array of clonal sequencing features is attached. The array can be constructed with both solid-phase and solution phase DNA amplification strategy for sequencing. The substrate comprises wells, the size and spacing of which is varied depending on the sequencing feature to be attached. In one embodiment, there are more than $1 \times 10^6$ sequencing features/mm$^2$. Alternatively, there are more than $6 \times 10^6$ sequencing features/mm$^2$. In another embodiment, there are between $1 \times 10^6$ and $10 \times 10^6$ sequencing features/mm$^2$. In another embodiment, there are between $1 \times 10^6$ and $7 \times 10^6$ sequencing features/mm$^2$. In yet another embodiment, there are between $4 \times 10^6$ and $7 \times 10^6$ sequencing features/mm$^2$. In yet another embodiment, there are between $5 \times 10^6$ and $25 \times 10^6$ sequencing features/mm$^2$.

Fabrication of the substrate with shallow wells with various sizes and pitches is achieved using deep ultra-violet (DUV) lithography. FIG. 1 provides a schematic description of the fabrication process. The substrate 101 is subjected to oxide 103, HMDS 105 and photoresist 107 deposition. The example shown here shows the fabrication procedure using silicon wafers. Other solid substrate materials can be used such as glass, quartz among others. A mask is placed on the substrate with a pattern for the desired size and density of wells. The substrate is then illuminated to develop the exposed area leaving a pattern of wells 109 in the photoresist layer. The substrate is then etched to remove the HMDS layer in the wells to expose the oxide layer. The photoresist from the non-well portions is also removed to expose the HMDS layer outside the wells.

The wells in the substrate are spots for attachment of a biomolecule, or an 'on' spot. The remainder of the array are 'off' areas. Specific coatings are applied which further distinguish the surface composition between 'on' and 'off' areas on the array. For example, in order to make the 'on' spots enabled for efficient attachment of biomolecules, the 'on' spot surface is functionalized to attract specific chemical groups existing on the biomolecules to attract, immobilize and bind using whatever necessary bonds (covalent, ionic, etc.). On the other hand, 'off' areas should repel biomolecules with high efficiency and ultimately guiding the molecules to the 'on' spots. As shown in FIG. 1, the 'on' spots' surface is composed of an oxide layer which in the subsequent processing step is specifically reacted with a second coating to produce an amine modified surface. The amine modified surface is a common surface to which DNA or other biomolecules can easily be attached using various conjugation chemistries or even via adsorption. The photoresist is removed from the 'off' area leaving the 'off' area composed of hexamethyldisilazane (HMDS), which is an effective repellent of both single and double stranded DNA, fluorophores and small biomolecules. The universal substrate can be composed of various combinations of 'on' and 'off' surface materials. For example, 'on' spots can be functionalized to compose of aldehydes, amines, azides, carboxyls, epoxy, isothiocyanate, alkynes to name a few. These functional groups are well known to be able to specifically attract and bind biomolecules through various conjugation chemistries. 'Off' areas can be coated with several chemical moieties that have shown biomolecule repelling abilities. These include glycol consisting polymers such as polyethylene glycol, mixture of propylene glycol methyl ether, propylene glycol methyl ether acetate, and ethyl lactate as well as hexamethyldisilazane, metals and their oxidized forms such as chromium (chromium oxide), tin (tin oxide) and titanium (titanium oxide).

If the substrate is to be used for sequencing, individual DNA sequencing features (clonally amplified DNA templates that can undergo sequencing reaction to produce secondary reporters for detection during imaging) are attached onto each 'on' spot. One sequencing feature is attached to each spot. If two or more features were attached onto one spot, it becomes nearly impossible to decipher the origin of the sequence information. Therefore, the method attaches one DNA sequencing feature per 'on' spot.

Figure 4:
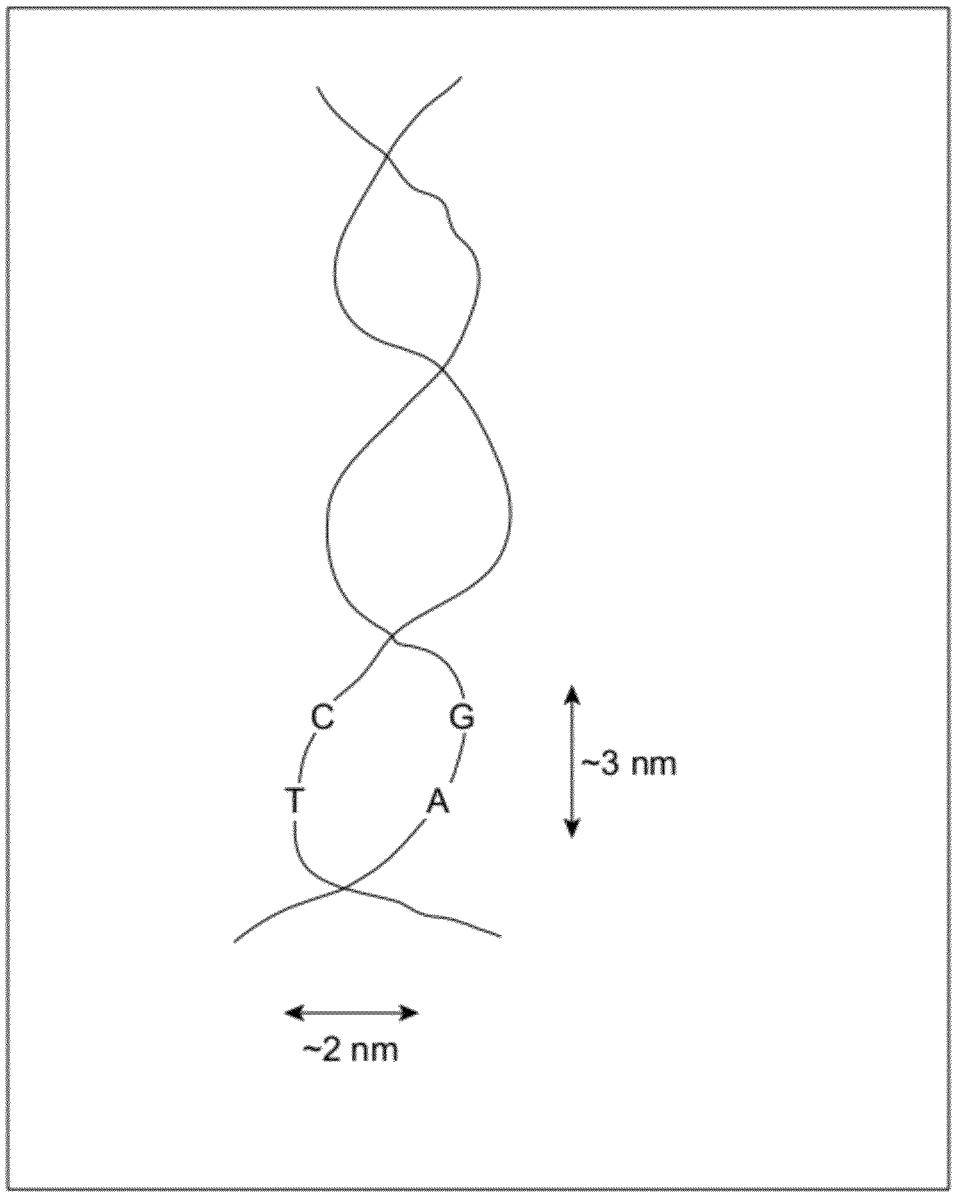
FIG. 4 is a sketch of DNA showing its size.

Due to polymeric nature of DNA, its size can be approximated. As shown in FIG. 4 a double stranded DNA's width is about 2 nanometers and a single repeating monomer unit is about 3 nanometers. From this, a 100 base long DNA, if measured stretched linearly, will be ~300 nm long. In DNA's natural setting, it exists in various physical forms, and most likely in some 3D configuration at an optimal energy state because DNA has so many polar elements in its structure. Single stranded DNA, especially longer strands, often will "ball" up because that 3D (secondary and tertiary structure) form provides the best energy state. Therefore, the DNA molecules, for use in the attachment reaction, can be approximated in size and shape and this information can be used to size the 'on' spots which will maximize the probability of one sequencing feature per spot. For example, a single-stranded DNA molecule of ~25-50 Kbases clumped up like a ball of yarn takes up the entire spot with the diameter of 400 nm or less. At spot sizes greater than this and using the same size DNA, the chances of multiple DNA molecules attaching to a single spot increases. With smaller DNA molecules (20-500 bases), the spot size is decreased. For example, a DNA molecule 100 bases in size may need spots sizes of 200 nm or smaller, or more likely, 100 nm or smaller or most likely 20 nm or smaller to ensure highest probability of one molecule per spot.

Figure 5:
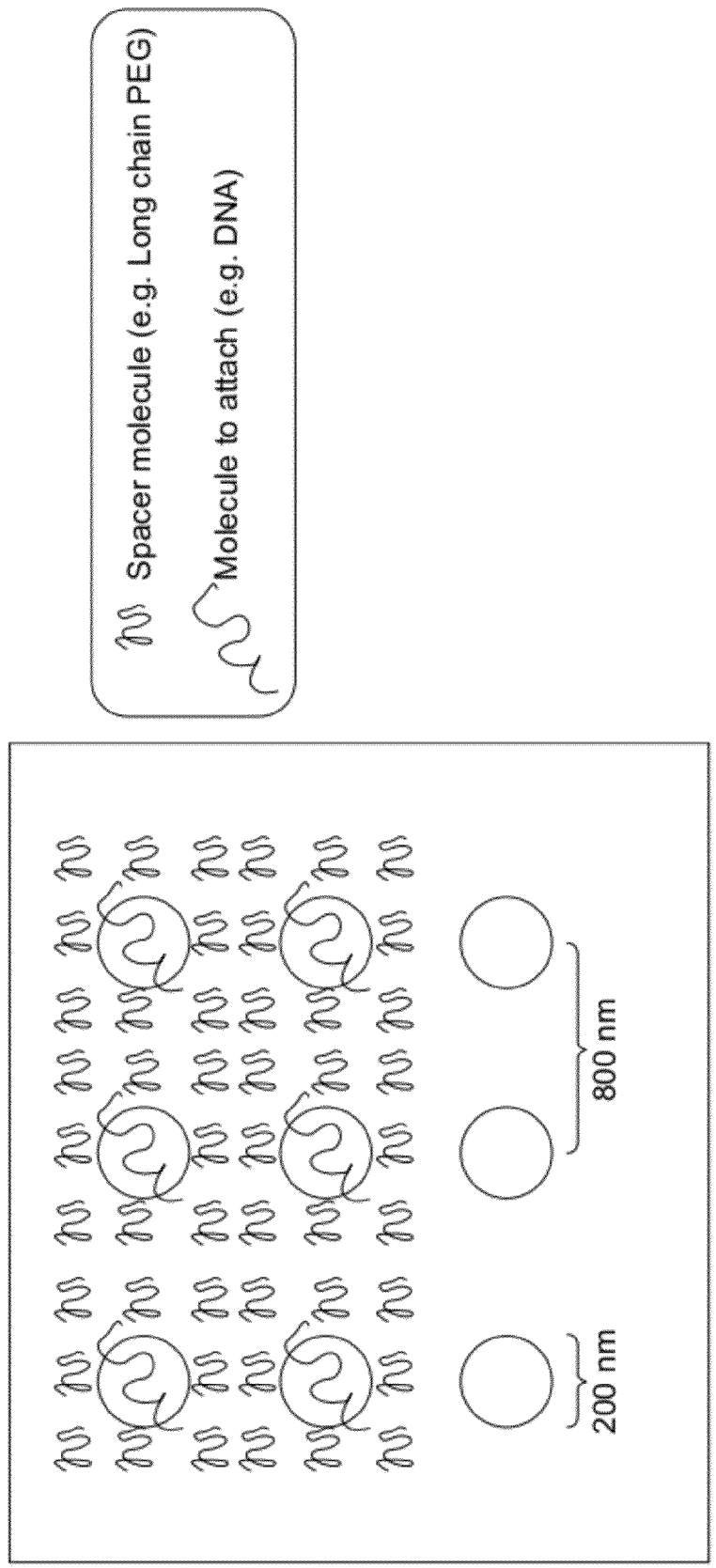
FIG. 5 illustrates the method of controlling attachment of sequencing features according to one embodiment.

In another embodiment, one sequencing feature per 'on' spot is accomplished through the use of spacer molecules to separate the active molecules so that during the attachment reaction active molecules are arranged so that they are on average separated by certain distances, which will inhibit or significantly limit two sequencing features ending up in the same 'on' spot. FIG. 5 is a schematic illustrating how spacer molecules are used to enable more precise attachment control of active molecules. In FIG. 5 active molecules for attachment (e.g., DNA) are separated during conjugation reaction onto the patterned surface using spacer molecules (e.g., long chain polyethylene glycol (PEG)). Depending on the spot size and pitch on the patterned substrate, ratio between spacer and active molecules is adjusted to enhance attachment characteristic such as one molecule per spot attachment.

Determining size and volume of a spacer molecule is described in reference to PEG. PEG with number average molecular weight ($M_n$) of 20,000 daltons has ~450 repeating units. Using 143 pm and 154 pm, the bond length for C—O and C—C bonds respectively, (the two bonds in the PEG chain), the length of a 20,000 dalton PEG molecule stretched out is ~135 nm. The shape of the stretched out PEG molecule is approximated to be a cylinder and thus the volume is $\pi r^2 h$. The h is 135 nm and the r is estimated to be 0.1 nm and thus the volume is 4.24 $nm^3$. In solution, the PEG molecule is more likely to be in a somewhat spherical shape but the volume remains the same. Thus using the volume of the cylindrically shaped PEG molecule, the radius of the spherically conformed molecule can be determined. The volume of a sphere is $4/3\pi r^3$. r is for the PEG in the spherical conformation is 1 nm. This assumes that the PEG molecule in the spherical conformation is densely packed. It is more likely to be loosely packed and three times the size. This leads to a radius of 3 nm or a diameter of 6 nm.

The size and volume of the sequencing features is determined using the same formulae. In one example, the sequencing feature is a DNA molecule of 100 bases in length. In the cylindrical conformation, the radius is 1 nm and the height is 300 nm. The volume of the cylindrical conformation comes to 942 $nm^3$. The radius of the spherical conformation then comes to 6.1 nm. DNA is similarly likely to be loosely packed and so the radius is 18.3 nm and the diameter ~36 nm.

In a second example the sequencing feature is a 50 kilobase DNA molecule. The radius is still 1 nm in the cylindrical conformation but the height is 150,000 nm. Thus the volume of the cylinder comes to 471,000 $nm^3$. The radius of the DNA in closely packed spherical conformation would be 48.3 nm and the loosely packed radius then is ~145 nm and diameter is ~290 nm.

Once one sequencing feature such as a DNA molecule is attached to one spot, either sequencing can be performed. In one embodiment, the sequencing features goes through amplification to increase the sensitivity of the detection prior to sequencing. Also, potentially a single DNA molecule can be attached in ordered patterns and be sequenced (single molecule sequencing).

Figure 6:
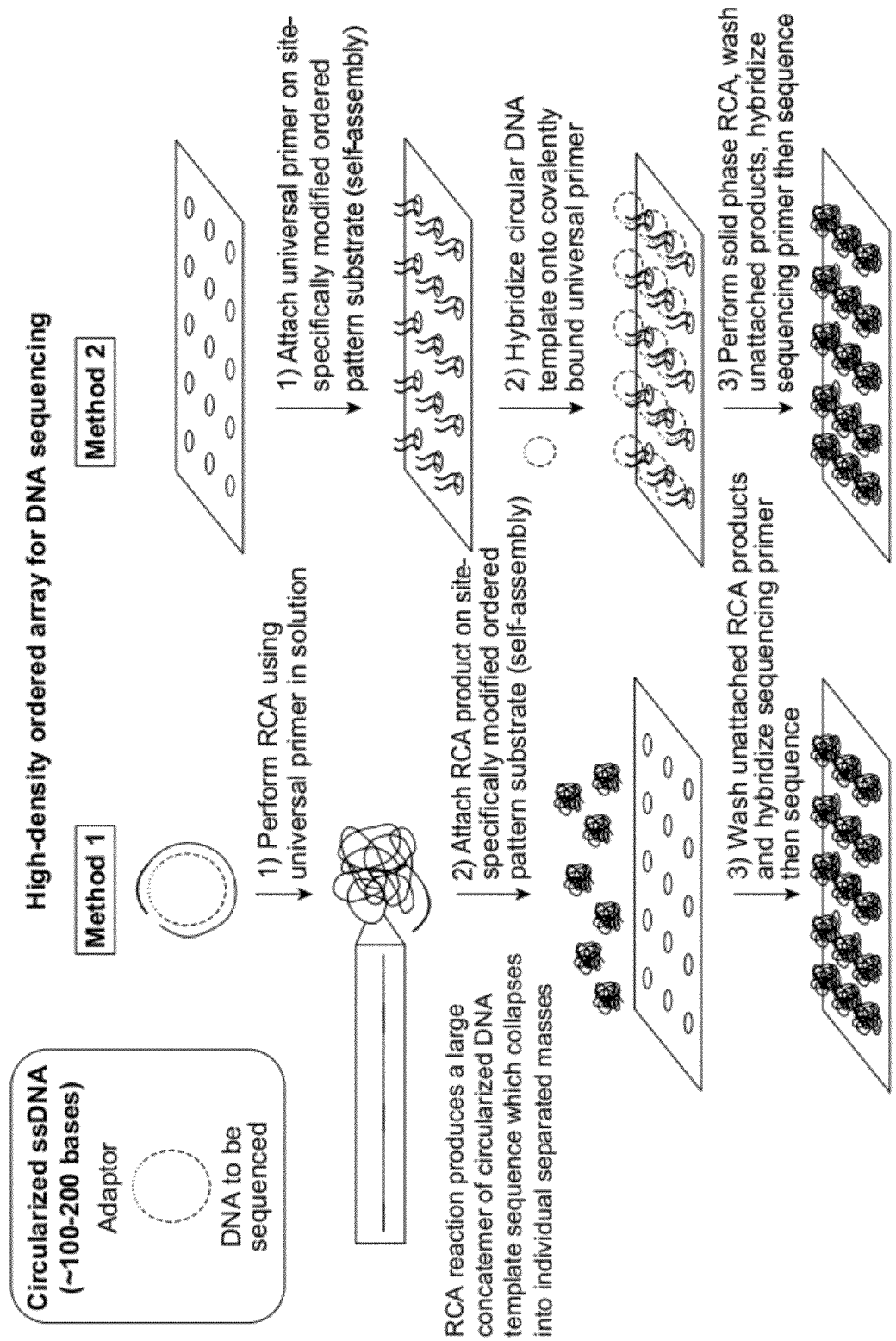
FIG. 6 outlines creation of a high-density ordered array for DNA sequencing according to two embodiments.

Construction of ultra-dense ordered array of clonal sequencing features is now described. This substrate can be used to construct an ordered array (with precise feature sizing and spacing) with both solid-phase and solution phase DNA amplification strategy for sequencing. FIG. 6 shows outlines of two methods for ordered array preparation procedure using the universal substrate.

In method 1, a solution-phase rolling circle amplification (RCA) reaction using a universal primer in solution produces clonal sequencing features. The RCA reaction produces a large concatemer of circularized DNA template sequence which collapses into individual separated masses. These features in solution are then flowed on top of the universal substrate and allowed to attach to site-specifically functionalized 'on' spots. The unattached RCA products are washed off. The sequencing primer is hybridized and sequencing can commence.

In method 2, a universal amplification primer is first covalently attached to the site-specifically functionalized 'on' spots on the substrate. Circular DNA templates are hybridized to the primer where, in most cases, one circular DNA template is bound per spot. Solid-phase RCA is then performed creating an order array of sequencing features.

The universal substrate's surface composition, functionalization strategy (making 'on' spots more enabling for attachment and making 'off' areas more resistant to attachment) as well as precise patterning of spot size and spacing are stringently controlled to maximally enable clonal amplification or attachment or both to occur on its site-specifically modified surface leading to ultra-dense ordered sequencing array.

Once the sequencing array is prepared, a sequencing primer can be hybridized to clonal DNA sequencing features on the array and sequencing reactions can be commenced. FIG. 7 shows overlaid fluorescence images of ordered sequencing arrays prepared using the methods described above after a cycle of sequencing reaction. To create the images, the arrays go through a sequencing reaction using fluorophore-modified sequencing reagent. Both methods 1 and 2 show specific attachment of features on only the designated ordered patterned 'on' spots and in most cases, each spot is represented with a single color corresponding to fluorophores attached to either A, C, G, or T. The images of FIG. 7 demonstrate that both solid-phase and solution-phase clonal DNA amplification/attachment methods can be achieved using the universal substrate.

Figure 8:
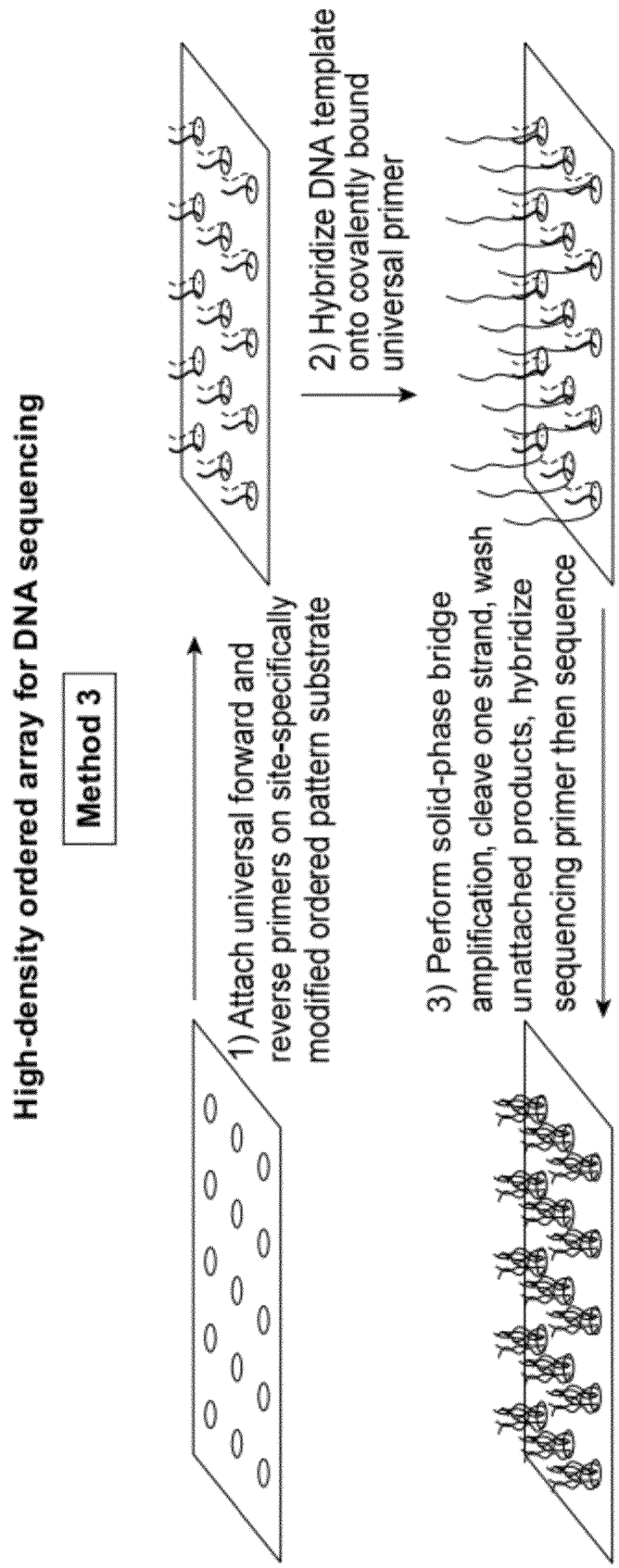
FIG. 8 outlines creation of a high-density ordered array for DNA sequencing according to a third embodiment.

Other sequencing array construction methods can be transformed onto this substrate leading to decrease in feature size, increased size uniformity and higher packing density. FIG. 8 demonstrates method 3 for constructing an array using bridge amplification. A universal forward and reverse primer is attached on each of the site-specifically modified ordered pattern substrate. In one embodiment, these are covalently bound. Then a DNA template is hybridized onto the universal primer. A solid-phase bridge amplification is performed followed by cleaving of one strand. The unattached products are washed and then the sequencing primer is hybridized. Sequencing can then commence.

Figure 9:
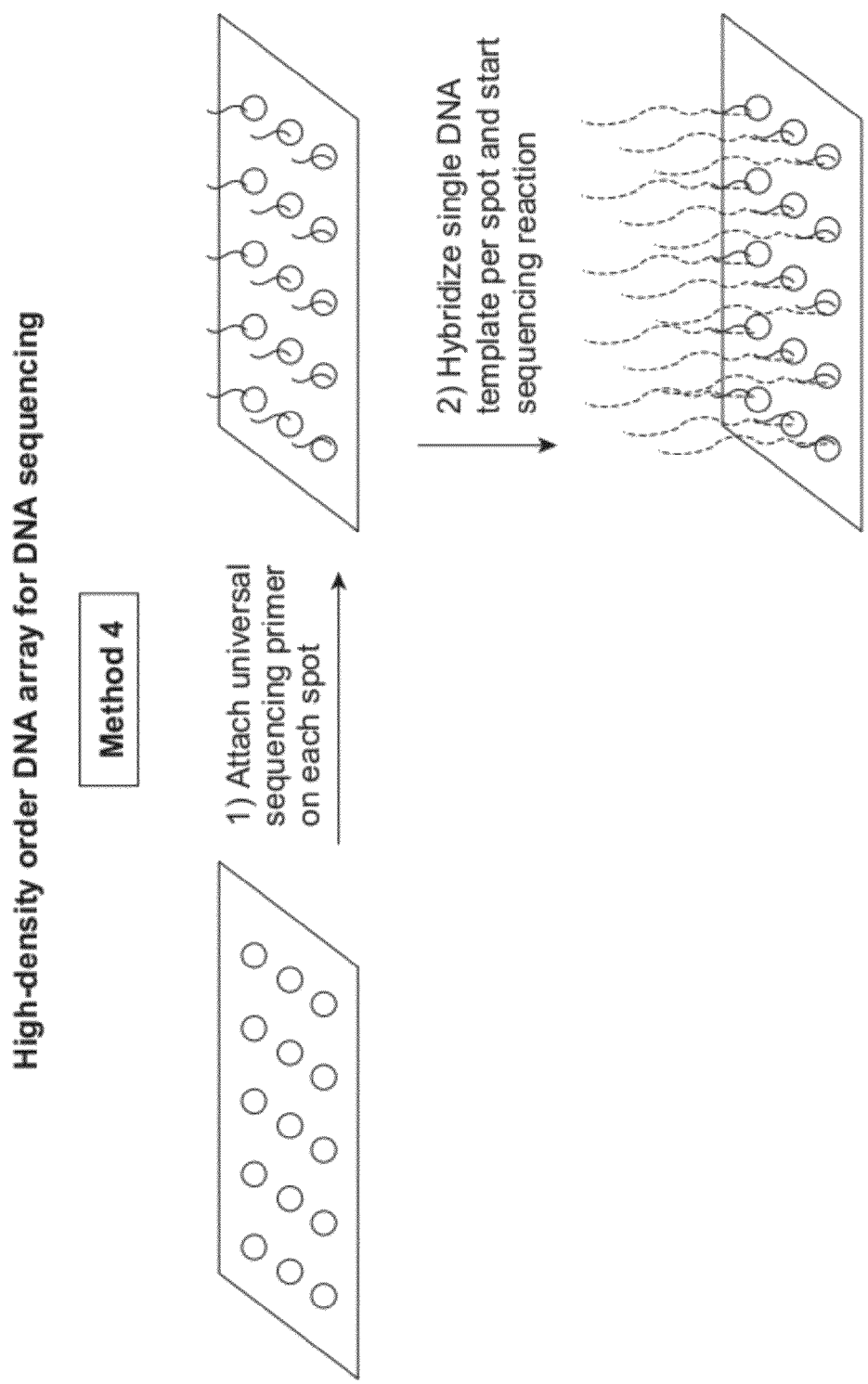
FIG. 9 illustrates constructing an array for single molecule DNA sequencing on the universal substrate.

FIG. 9 illustrates constructing an array for single molecule DNA sequencing on the universal substrate. A universal sequencing primer is attached to each spot. A single DNA template is hybridized to the universal sequencing primer and sequencing can commence.

Uses of the Substrate

Figure 10:
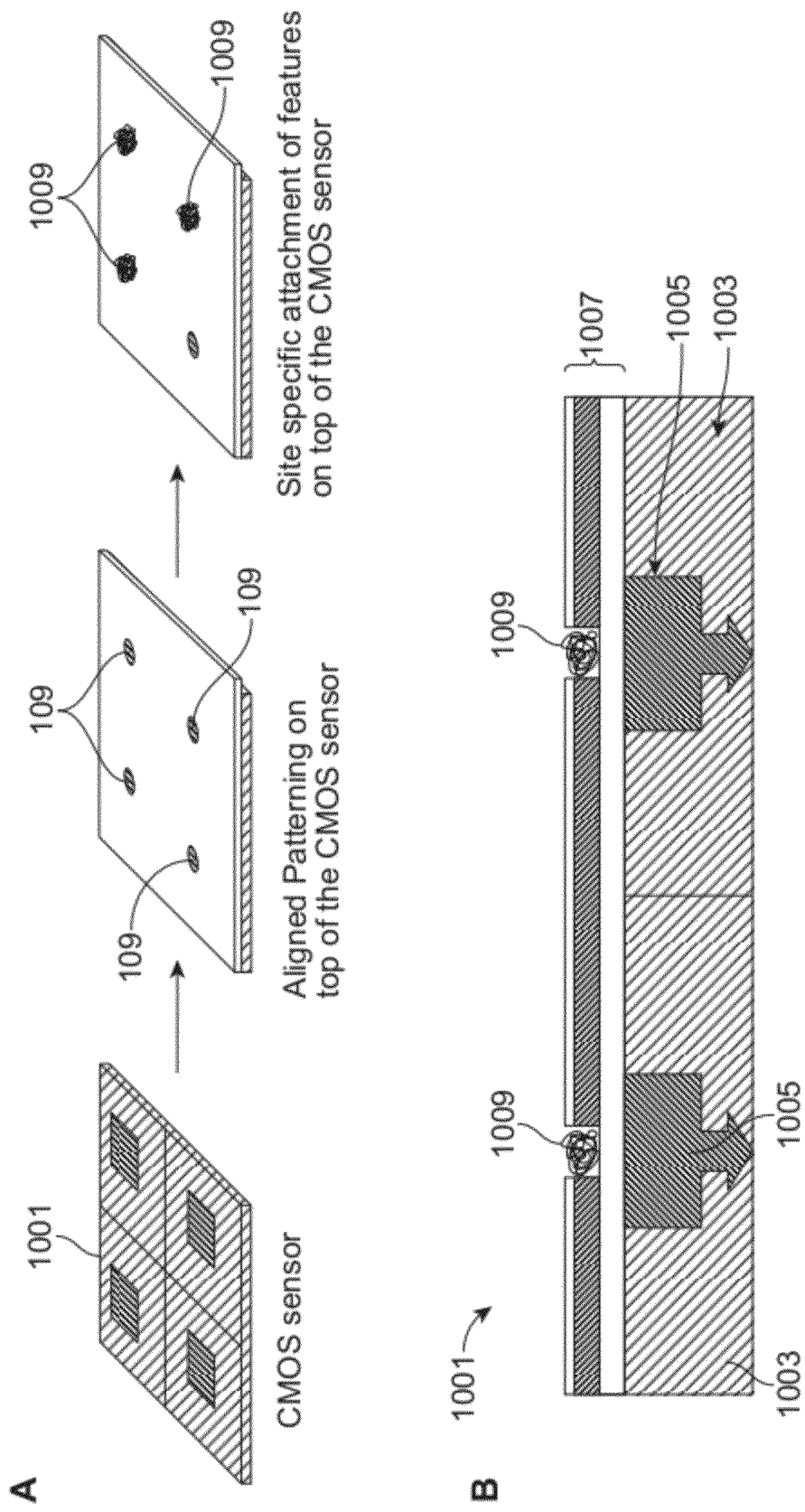
FIGS. 10A and B illustrate creation of a CMOS sensor according to one embodiment.
Figure 11:
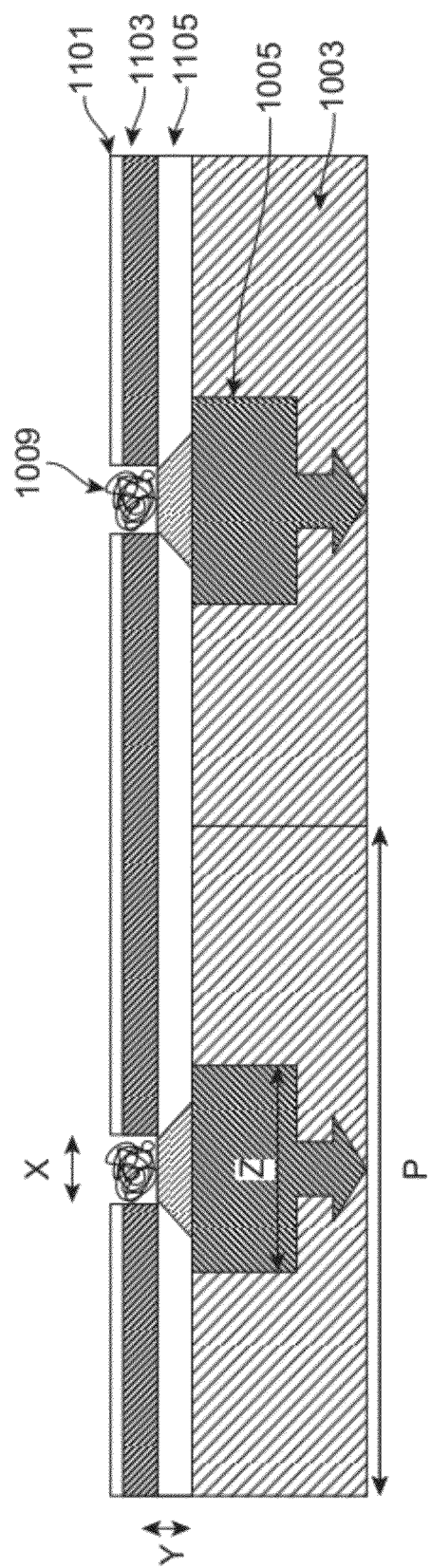
FIG. 11 illustrates determination of the detection efficiency and throughput for a CMOS sensor.

A post-modification of Complementary Metal Oxide Semiconductor (CMOS) sensor surface enables subsequent construction of ultra-dense ordered array of biomolecules directly on top of CMOS sensor. The surface of the CMOS sensor is modified as described above through lithographic and surface chemistry techniques and allows attachment of biomolecules directly on top of the sensing component within each of the CMOS pixels as shown in FIGS. 10 and 11. This allows detection of binding at the attached biomolecule. For example, the biomolecules can be treated to produce chemiluminescence-based reporting signals which are detected directly by the CMOS sensing architectures without the need for additional optical components. Alternatively, the biomolecules have reporter moieties or are modified to attach reporter moieties which upon excitation produce signals such as fluorescence.

As illustrated in FIG. 10, lithographic patterning as described herein can be performed on top of the CMOS sensor architecture, where the 'on' spots for the biomolecules are created directly on top of and centered on each of the CMOS sensing components of every pixel. In this case, each individual pixel becomes an independent detection system and the throughput of the detection depends on the total number of pixels within the CMOS chip. Referring to FIG. 10A, patterning is aligned on top of a CMOS sensor 1001 and then site-specific attachment of features according to any of the disclosed methods proceeds on top of the CMOS sensor 1001.

FIG. 10B is a cross-section of the resulting CMOS sensor comprising lithographic and chemical layers 1007 as well as the biomolecule 1009 on top of the sensor pixel 1003. The sensor pixel 1003 includes an active detection element 1005. Referring to FIG. 11, lithographic and chemical layers 1007 include a passivation layer 1101, opaque layer 1103 and an oxide layer 1105.

Since the numerical aperture (NA) is directly related to the amount of cone angle of the signal source that the lens can collect, and hence its signal capture efficiency, use of a high NA lens is useful for high-sensitivity detection. Compared to conventional lens-based detection systems, in terms of NA effect on detection sensitivity and functionality, the modified CMOS chip provides high NA (>0.95) without limiting the functionality of the overall system since the use of optics and the corresponding demanding requirements are no longer necessary. The improved detection sensitivity of the modified CMOS sensor enables target detection where the target molecule produces very low amounts of reporting signals as well as where the target is a single molecule producing a single reporting signal.

Modified CMOS chip design allows high reporting signal capture efficiency. Detection sensitivity is significantly enhanced since the target molecule for detection is in very close proximity to the CMOS sensing component. Furthermore, the modification to the CMOS chip surface can be tailored for target detection needs. Referring to FIG. 11, detection efficiency and throughput can be derived by relationship between the size of the target molecule (X), distance between the target molecule and the active sensing component (Y), size of the active sensing component and the size of the unit CMOS pixel (P). The additional functional 'layers' on top of the CMOS sensor surface minimizes 'spill-over' effect, which happens when reporting signals from molecules attached on adjacent pixels are detected. This allows CMOS chip to perform at its highest efficiency since each of its pixels becomes a discrete, individual detection system.

In conventional lens-based CCD detection, there are detection strategies, such as binning, where sensitivity (signal to noise ratio) and detection speed can be improved. However, these strategies effectively sacrifice other significant functionalities to achieve the improvement. For example, binning uses multiple pixel information (2×2, 3×3 pixels, etc.) to increase sensitivity and speed, while decreasing spatial resolution. Therefore the amount of distinct information per pixel (since it can be 1 to N pixels per object) suffers and subsequently the potential for higher throughput detection. In the modified CMOS sensor, each of the individual pixels are assigned to detect one distinct object (1 pixel per object) since the individual pixel's enhanced native sensitivity.

Detection Sensitivity.

Figure 12:
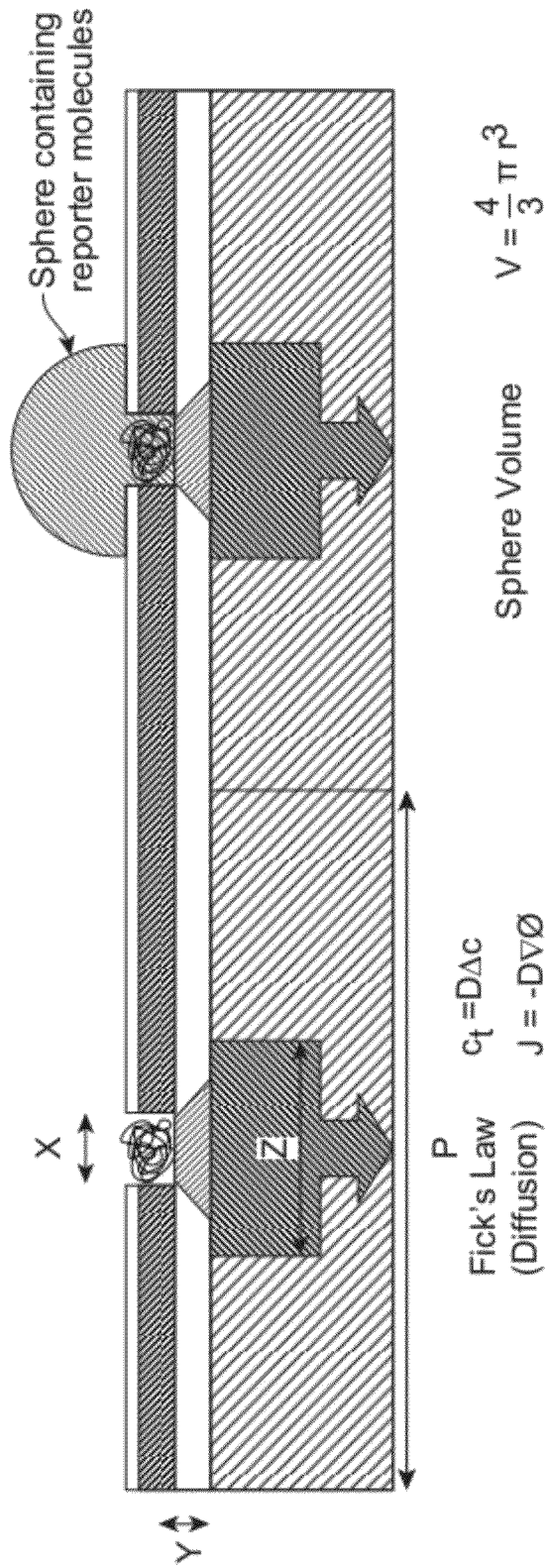
FIG. 12 illustrates an example determination of detection efficiency.

Using simplified Fick's (diffusion) equation ($c_t$=$D\Delta c$ and $J$=$-D\nabla\phi$), distance of molecules diffusing from the source can be estimated given temporal information (integration time). Assuming a finite number of reporter molecules to start with, an approximate molecule density that arrives at and can be collected by the individual CMOS sensor can be calculated. In the example in FIG. 12, reporter molecules are assumed to diffuse during detection. There's a 0.1-100 second integration time. A sphere of reporter molecules forms around the feature and the sphere is assumed to have a radius of ~3× the diameter of the feature of which the radius of ~1.2 µm. The volume of the sphere is thus 7.24 µm$^3$. Assuming 500 reporter molecules in the sphere, the density of reporter molecules is 69 molecules/µm$^3$.

The CMOS sensor attached to the substrate of the disclosure detects signals. Detection at a CMOS sensor can be of fluorescence but also chemiluminescence. Use of chemiluminescence is especially advantageous as it does not require the use of a light source to excite a reporting moiety like in fluorescence. This removes complexity from the apparatus.

EXAMPLES

General Procedures

A silicon wafer-based substrate was fabricated using a p-type-(100) silicon wafer. First, a thin oxide layer was grown on the wafer surface using a thermal oxidation process, followed by cleansing steps using sulfuric acid, ammonium hydrogen peroxide, water and isopropanol rinses. To improve the adhesion of the photo-resist to the oxide surface, HMDS was vapor deposited onto the oxide surface before spin-coating positive photo-resist material and baked. A KrF step and repeat scanning system was then used in combination with a mask to illuminate the exposed area with a 248 nm deep-UV light source. The exposed area was then developed which produced nanometer-sized wells in the photo-resist layer. Finally, reactive ion etching (RIE) process was used to etch out any remaining residual photo-resist and HMDS layer thereby exposing the oxide layer.

Various substrates with well diameters ranging from 200 nm to 600 nm and pitches ranging from 400 nm to 1600 nm were successfully constructed using this fabrication procedure. Scanning Electron Microscopy (SEM) images of the fabricated substrates are shown in FIG. 2. FIG. 2A shows a cross-sectional SEM image of a substrate with well diameter of 420 nm and 800 nm pitch. SEM image confirmed uniformity of the well diameter and pitch throughout large areas of the substrate. FIG. 2B is a zoomed in view of the same substrate as in FIG. 2A which confirmed RIE process effectively removed residual photo-resist residues on the bottom of wells. FIG. 2C is a top-view SEM image of a substrate with 0.2 µm feature diameter and 0.4 µm pitch. FIG. 2D is a top-view SEM image of a substrate with 0.24 µm feature diameter and 0.48 µm pitch. FIG. 2E is a top-view SEM image of a substrate with 0.24 µm feature diameter and 1.6 µm pitch. The scale bar in images FIGS. 2C-2E measures 2 µm.

To confirm the fabricated substrate can be functionalized site specifically for controlled attachment of biomolecule, the entire fabricated substrate was first immersed in a 3-aminopropyltrimethoxysilane solution. The amino-silane reacts with the exposed silicon oxide layer thereby coating the bottoms of the wells with functional amine groups. Subsequently, the photo-resist was removed using an appropriate stripping solvent (NMP, acetone, etc.) and rinsed with isopropyl-alcohol. N-Hydroxysuccinimide ester-modified fluorophore was then used to covalently immobilize the fluorophores onto the site-specific amine functionalized spots. The results were verified by taking fluorescent images of patterned substrates after attachment of dye molecules. FIGS. 3A-D are images of fluorophore modified substrates with feature size of 0.24 µm (imaged with 100× objective). The four substrates have feature pitches (A) 0.48 µm, (B) 0.60 µm, (C) 1.0 µm and (D) 1.4 µm. The scale bar in each of the images measures 2 µm.

Example 1

Preparation of Silicon Wafers

Materials:
Silicon wafer: 8 inch, p-type (100), Boron dopant, 695-755 µm thickness. 3-25 Ohm-cm resistance
Concentrated sulfuric acid
Hydrogen peroxide
Ammonium hydroxide
Isopropyl alcohol (IPA)
Hexamethyldisilazane
Positive photoresist
Heat block
Procedure:

To clean the silicon wafers, they were immersed in piranha solution (3:1 concentrated sulfuric acid to 30% hydrogen peroxide. (caution: this mixture reacts violently with organic materials and must be handled with extreme care)) for 10 minutes at 120° C. The wafers were then rinsed with DI water for 400 sec. A standard clean step (SC-1) was performed next. The wafers were soaked into a 1:1:5 solution of $NH_4OH+H_2O_2+H_2O$ at 75° C. for 10 minutes. After the SC-1, the wafers were again rinsed with DI water. IPA vapor was applied to the surface for 15 minutes at 80° C. for drying the wafers. The above cleaning steps can either be performed manually or using a standard automated cleaning station available in many of the semiconductor fabrication centers.

On a clean silicon wafer, oxide was thermally grown inside a furnace to a thickness of 900 Å. The thermal oxidation was in the form of wet oxidation, where the oxidation is mainly governed by the following equation:

$$Si(solid)+2H_2O(vapor) \rightarrow SiO_2(solid)+2H_2(vapor).$$

In order to create the patterns on the wafers, deep ultraviolet lithograph (DUV) was performed. The substrates were vapor-coated with HMDS to enhance the adhesion of photoresists to the oxide. Positive photo-resist was then spin coated onto the substrate to a thickness of 0.38 µm, followed by soft baking (110° C. for 60 sec). The photoresist-coated substrate was then exposed to 248 nm KrF source UV light through a photomask containing the desired patterns and subsequently post-baked at 110° C. for 90 sec. The patterned wafers were then developed in a developing solution to create the desired micropatterned wells. The patterned substrate was hard baked at 110° C. for 75 sec.

$O_2$ plasma descumming was applied for 60 sec to remove any remaining photoresist inside the patterned wells. The HMDS layer on the surfaces of the exposed wells was removed using buffered oxide etchant (BOE). The wafers were immersed in a 1:300 BOE solution for 100 seconds. The BOE also etches the oxide layer and the expected etching amount is 40 Å. The etching was done manually using a Teflon dish. The wafers were then stored sealed until further chemical functionalization process could be performed.

Example 2

Preparation of Quartz Wafers

Materials:
Quartz wafer: 8 inch synthetic quartz, thickness: 725 µm±20 µm, double side polished, flatness (TV5/max-min): Max 3 µm, roughness (A): Ra<15
Concentrated sulfuric acid
Hydrogen peroxide
Ammonium hydroxide
IPA
Hexamethyldisilazane
Positive photoresist
Heat block
Procedure:

Silicon wafers were immersed in piranha solution for 10 minutes at 120° C. The wafers were then rinsed with DI water for 400 sec. SC-1 was performed. The wafers were soaked into a 1:1:5 solution of $NH_4OH+H_2O_2+H_2O$ at 75° C. for 10 minutes. After the SC-1, the wafers were again rinsed with DI water. IPA vapor was applied to the surface for 15 minutes at 80° C. for drying the wafers. 1000 Å thick titanium was deposited onto the cleaned quartz surface. In other embodiments, chromium, tin, aluminum can be applied as well.

In order to create the patterns on the wafers, deep ultraviolet lithograph (DUV) was performed. The substrates were vapor-coated with HMDS to enhance the adhesion of photo-resists to the oxide. Positive photo-resist was then spin coated onto the substrate to a thickness of 0.38 µm, followed by soft baking (110° C. for 60 sec). The photoresist-coated substrate was then exposed to 248 nm KrF source UV light through a photomask containing the desired patterns and subsequently post-baked at 110° C. for 90 sec. The patterned wafers were then developed in a developing solution to create the desired micropatterned wells. The patterned substrate was hard baked at 110° C. for 75 sec.

Dry etching technique ($BCl_3/Cl_2$ were used as etchants) was applied to remove the titanium layer on the surface of the exposed wells from patterning. The energy level of the etchant gas was dynamically adjusted during the etching process. The energy level at the end of the etching process was made to be higher than the level at the beginning of the process. The exposed quartz layer was $O_2$ plasma ashed to remove the remaining organic materials such as photo-resist. The wafers were then stored sealed until further chemical functionalization process was performed.

Example 3

Site-Specific Amine Functionalization on Patterned Substrates

Materials:
3-aminopropyltrimethoxysilane (APTMS)
De-ionized water
N-methylpyrrolidone (NMP) or Dupont's photoresist remover EKC 800 or EKC 830
IPA
Water bath sonicator
Heat block Procedure (for Patterned Wafer Diced into 24×60 Mm Substrate Pieces):

Amine functionalization solution was prepared by diluting 1 mL of APTMS in 150 mL of DI water inside a 250 mL beaker. The amine solution was agitated and sonicated for 10 sec for mixing. The patterned substrate was placed in the amine solution and briefly sonicated (3 sec). The substrate was then incubated in the amine solution for 2 min. Sonication in amine solution followed by incubation in the amine solution was repeated two more times. The substrate was then place into 250 ml of fresh DI water and agitated to remove non-covalently bound APTMS. After the DI water wash the substrate was dried with a stream of nitrogen gas. The substrate was then cured at 110° C. for 5 min.

In order to remove the photoresist, the water temperature in the water-bath sonicator was adjusted to 72° C. 150 ml of photoresist removing solution EKC830 was place into a 250 ml beaker. The beaker containing the photoresist removing solution was placed in the 72° C. water bath sonicator. The amine-treated substrate was then placed in the beaker and sonicated for 180 sec. After sonication the substrate was incubated for additional 90 sec. Steps d) and e) were repeated 1 more time. The substrate was then washed with IPA and dried with stream of nitrogen gas.

Example 4

DNA Template Circularization

Materials:

5'-Phosphorylated DNA template (5P_Temp1)—PAGE purified (sequence: 5'-P-GTT CCT CAT TCT NNN NNN NNN NNN NNN NNN NNN NNN NNN NNN NNN NNN NNN NNN NNN NNN NNN NNN NNN NNN CTG CCC CGG-3' (SEQ ID NO:1))

CircLigase (Epicentre)
CircLigase Buffer (10×)
Exo I (NEB)
Exo III (NEB)
Exo I Buffer (10×)
NEB buffer I (10×)
Qiagen PCR purification spin columns
Heating block Procedure:

The following ingredients were mixed in a 1.5 mL tube: deionized water—65 µL; CircLigase buffer [10×]—10 µL; 5P_Temp1 [10 µM]—10 µL; ATP [1 mM]—5 µL; MnCl₂ [50 mM]—5 µL and CircLigase—5 µL. The final solution was 100 µL and incubated at 60° C. for 2 hours and 80° C. for 10 min. After incubation, the following ingredients were added to the tube: deionized water—56.5 µL; Exo I buffer [10×]—20 µL; NEB buffer I [10×]—20 µL; Exo I—3 µL and Exo III—0.5 µL. The final solution volume was 200 µL. This solution was incubated at 37° C. for 30 min. and then 80° C. for 15 min.

After the reaction mixture cooled down to room temperature, circularized templates were purified using Qiagen spin columns following the instruction on its user manual. The mixture was divided into 100 µL aliquots and purified in 2 spin columns. The final purified products from the 2 columns (50 µL elutions) were pooled together.

Example 5

RCA in Solution to Generate Individualized Clonally Amplified DNA Product

Materials:

Circularized DNA template (from Example 4)
5'-Amino-RCA Primer (5NH2_RCA_Primer)

(sequence: 5'-NH2-TTT TTT AGA ATG AGG AAC CCG GGG CAG-3' (SEQ ID NO: 2))

5'-Cy3 labeled Hybridization Oligo (5Cy3_Hyb_Oligo)

(sequence: 5'-Cy3-TTT TTT CUG CCC CGG GUT CCT CAU TCT-3' (SEQ ID NO: 3))

RephliPhi Phi29 DNA polymerase (Epicentre)
Phi29 Buffer Buffer (10×)
dNTPs (25 mM)
DTT (100 mM)
Polyethylene glycol (PEG) solution (30% w/v, Mw ~20000)
5× Sodium Chloride Sodium Phosphate with 50 mM EDTA and 0.1% Tween20 (SSPE/ET)
Whatman Syringe filter (13 mm disposable filter, glass microfiber material, 1.6 um pore size)
1 mL disposable syringe
Glass coverslips (#1.5 thickness)
Heating block Procedure:

The following ingredients were mixed in a 1.5 mL tube: De-ionized water—32.5 µL; Phi29 10× buffer—5 µL; PEG solution (30% w/v, Mw~20000)—7 µL; DTT [100 mM]—1 µL; dNTP [25 mM]—2 µL; 5NH2 RCA primer [10 µM]—0.5 µL; Circularized Template—1 µL, and Phi29 polymerase—1 µL. This provided a total solution volume of 50 µL, and incubated at 35° C. for 30 minutes and then 20° C. for 4 hrs.

After the reaction was completed, 350 µL of 5×SSPE/ET was added to the reaction mixture and gently vortexed. 400 µL of the reaction mixture was placed in the syringe filtering unit (Whatman filter attached to 1 ml syringe) and filtered to remove large particles from the mixture. The filtered mixture was collected in a new 1.5 ml tube. To confirm the RCA reaction worked, a fluorescent primer hybridization reaction was performed using this mixture. 5 µL of reaction mixture above was mixed with 45 µL of fresh 5×SSPE_ET in 1.5 ml tube. 5 µL of 5Cy3_Hyb_Oligo (10 µM) was then added to the 50 µL mixture and gently vortexed. This mixture (having volume of 55 µL) was then incubated at room temp for 15 min. After incubation, 3 µL was aliquotted and dispensed on the center of a glass coverslip followed by placing another coverslip on top of it. This coverslip 'sandwich' with RCA product was imaged using epi-fluorescent microscopy. A successful RCA reaction and subsequent fluorescent primer hybridization produced bright individual bead-like structures when viewed under the microscope. The filtered and confirmed mixture was kept as a stock clonally amplified DNA product.

Example 6

High-Density Order Array Construction for DNA Sequencing (Method 1)

Materials:
Patterned substrates from either Example 1 or Example 2
Clonally amplified DNA product from Example 5
Bis(Sulfosuccinimidyl) suberate (BS3) crosslinker
PBS
5'-phosphate sequencing primer (5P_Seq_primer)

```
(sequence: 5'-P-CUG CCC CGG GUT CCT CAU TCT-3'
(SEQ ID NO: 4)
```

5× Sodium Chloride Sodium Phosphate with 0.1% Tween20 (SSPE/T)
5× Sodium Chloride Sodium Citrate with 0.1% Tween20 (SSC/T)
Glass coverslip Procedure:
BS3 solution was prepared by resuspending 2 mg of BS3 with 1 mL of PBS. 1 µL of BS3 solution was mixed with 49 µL of clonally amplified DNA product solution from protocol 5 and gently vortexed. This mixture was immediately dispensed on top of the patterned substrate and carefully placed the coverslip on top of the mixture to immerse patterned area surface with the mixture. The substrate and mixture was covered to minimize evaporation and incubated for 30 min. After incubation, the substrate was washed by immersing the substrate in 5×SSPE/T and allowing the coverslip to naturally slide off from the substrate. A second wash was performed using 5×SSC/T.

To hybridize fluorescent primers on immobilized sequencing features, 2 µL of 5Cy3_Hyb_Oligo (10 µM) was mixed with 48 µL of fresh 5×SSC/T. This mixture (50 µL total volume) was dispensed on top of the substrate with the sequencing features attached from above. A glass coverslip was placed on top to immerse the attached features with the fluorescent probe solution and incubated at 37° C. for 15 min and at room temp for 15 min. After incubation, the substrate was washed by immersing the substrate in 5×SSC/T and allowing the coverslip to naturally slide off from the substrate. A second wash was performed using 5×SSPE/T. A fresh coverslip was placed on top of the substrate and imaged using epi-fluorescent microscopy. Successful attachment and subsequent fluorescent primer hybridization produced bright individual bead-like structures attached according to the ordered pattern on the substrate when viewed under the microscope.

The Sequencing Reaction on Ordered DNA Sequencing Array.

The sequencing by ligation (SBL) reaction mixture was prepared as a mixture of: De-ionized water—19 µL; 2× ligation buffer—25 µL; 5P_Seq_Primer [100 µM]—1 µL; Nonamer mix [25 µM]—4 µL, and Rapid Ligase—1 µL. The total mixture volume was 50 µL.

The sequencing substrate was first washed with 1× ligation buffer. Then, 50 µL of the sequencing mixture was dispensed on top of the substrate. A glass coverslip was placed on top to immerse the attached features with the fluorescent sequencing mix and incubated at room temp for 15 min and at 37° C. for 15 min. After incubation, the substrate was washed by immersing the substrate in 5×SSC/T and allowing the coverslip to naturally slide off from the substrate. A second wash was performed using 5×SSPE/T. A fresh coverslip was placed on top of the substrate and imaged using epi-fluorescent microscopy. A successful attachment and subsequent fluorescent sequencing reaction produced bright individual bead-like structures attached according to the ordered pattern on the substrate when viewed under the microscope and imaged at emission filters corresponding to the fluorophores from the sequencing mix. FIG. 7, Method 1 illustrates the resulting image.

Example 7

High-Density Order Array Construction for DNA Sequencing (Method 2)

Materials:
Patterned substrates from either protocol 1 or 2
Circularized DNA template (from Example 4)
5'-Amino-RCA Primer (5NH2_RCA_Primer)

```
(sequence: 5'-NH2-TTT TTT AGA ATG AGG AAC CCG GGG
CAG-3'(SEQ ID NO: 2))
```

Bis(Sulfosuccinimidyl) suberate (BS3) crosslinker
PBS
5'-phosphate sequencing primer (5P_Seq_primer)

```
(sequence: 5'-P-CUG CCC CGG GUT CCT CAU TCT-3'
(SEQ ID NO: 4)
```

Polyethylene glycol (PEG) solution (30% w/v, Mw ~20000)
5× Sodium Chloride Sodium Phosphate with 0.1% Tween20 (SSPE/T)
5× Sodium Chloride Sodium Citrate with 0.1% Tween20 (SSC/T)
Glass coverslip Procedure:
To attach the primer on the patterned substrate, a BS3 solution was prepared by resuspending 2 mg of BS3 with 1 mL of PBS. 1 µL of BS3 solution was mixed with 49 µL of 5NH2_RCA_Primer [100 nM] solution and gently vortexed. The mixture was immediately dispensed on top of the patterned substrate and placed the coverslip on top of the mixture carefully to immerse patterned area surface with the mixture. The substrate and mixture was covered to minimize evaporation and incubated for 30 min. After incubation, the substrate was washed by immersing the substrate in 5× SSPE/T and allowing the coverslip to naturally slide off from the substrate. A second wash was performed using 5×SSC/T.

For the RCA reaction on surface of patterned substrate, the following ingredients were mixed in a 1.5 mL tube: deionized water—33.8 mL; Phi29 10× buffer—5 L; PEG solution (30% w/v, Mw~20000)—7 µL; DTT [100 mM]—1 µL; dNTP [25 mM]—2 µL; Circularized Template—0.2 µL and Phi29 polymerase—1 µL. The resulting solution had a volume of 50 µL and was dispensed on top of the substrate with the primers attached from above. A glass coverslip was placed on top to immerse the attached primers with the RCA solution and incubated at 35° C. for 20 min and at room temp for 20 min. After incubation, the substrate was washed by immersing the substrate in 5×SSC/T and allowing the coverslip to naturally slide off from the substrate. A second wash was performed using 5× SSPE/T.

To hybridize fluorescent primers on immobilized sequencing features, 2 µL of 5Cy3_Hyb_Oligo (10 µM) was mixed with 48 µL of fresh 5×SSC/T. This mixture (50 µL) was dispensed on top of the substrate with the sequencing features created from above. A glass coverslip was placed on top to immerse the attached features with the fluorescent probe solution and incubated at 37° C. for 15 min and at room temp for 15 min. After incubation, the substrate was washed by immersing the substrate in 5×SSC/T and allowing the coverslip to naturally slide off from the substrate. A second wash was performed using 5× SSPE/T. A fresh coverslip was placed on top of the substrate and imaged using epi-fluorescent microscopy. A successful attachment and subsequent fluorescent primer hybridization produced bright individual bead-like structures attached according to the ordered pattern on the substrate when viewed under the microscope.

The sequencing reaction on ordered DNA Sequencing Array Constructed Using Solid-Phase Amplification.

A sequencing by ligation (SBL) reaction mixture was prepared by mixing the following ingredients: deionized water—19 µL; 2× ligation buffer—25 µL; 5P_seq_Primer [100 µM]—1 µL; Nonamer mix [25 µM]—4 µL, and Rapid Ligase—1 µL. The total solution volume was 50 µL.

Sequencing substrate was first washed with 1× ligation buffer. Then, 50 µL of the sequencing mixture was dispensed on top of the substrate. A glass coverslip was placed on top to immerse the attached features with the fluorescent sequencing mix and incubated at room temp for 15 min and at 37° C. for 15 min. After incubation, the substrate was washed by immersing the substrate in 5×SSC/T and allowing the coverslip to naturally slide off from the substrate. A second wash was performed using 5×SSPE/T. A fresh coverslip was placed on top of the substrate and imaged using epi-fluorescent microscopy. A successful solid-phase amplification to generate clonal sequencing features and subsequent fluorescent sequencing reaction produced bright individual bead-like structures attached according to the ordered pattern on the substrate when viewed under the microscope and imaged at emission filters corresponding to the fluorophores from the sequencing mix. FIG. 7, Method 2 is the resulting image.

Example 8

High-Density Order Array Construction for DNA Sequencing (Method 3)

Materials:
Patterned substrates from either Examples 1 or 2
Linear DNA template (Sequence: 5'-caagcagaagacggcatacgagctcttccgatct NNNNNNNNNNNNNNNNNNNNNNNNNNNNNNNNNNNNNNNNagatcggaagagc gtcgtgtagggaaagagtgtagatctcggtggtcgccgtatcatt (SEQ ID NO: 5))

5'-Amino-surface Primer forward (5NH2_SP_F)

(sequence: 5'-NH2-TTT TTT AATGATACGGCGACCACCGAGA

TC-3' (SEQ ID NO: 6))

5'-Amino-surface primer reverse (5NH2_SP_R)

(sequence: 5'-NH2-TTT TTT caagcagaagacggcaUacga-

3' (SEQ ID NO: 7))

Bis(Sulfosuccinimidyl) suberate (BS3) crosslinker
Fusion (Hot start) Polymerase
USER enzyme PEG solution (30% w/v, Mw~20000)
PBS
1×TE buffer
0.01N NaOH
5× Sodium Chloride Sodium Phosphate with 0.1% Tween20 (SSPE/T)
10×SSPE/T
5× Sodium Chloride Sodium Citrate with 0.1% Tween20 (SSC/T)

Procedure:

Forward and reverse primers are attached onto the patterned substrate as follows. BS3 solution is prepared by resuspending 2 mg of BS3 with 1 mL of PBS. 1 µL of BS3 solution, 44 µL of 5NH2_SP_F/5NH2_SP_R [200 nM] solution and 5 µL of PEG solution are mixed and gently vortexed. This mixture is immediately dispensed on top of the patterned substrate to immerse patterned area surface with the mixture. The substrate and mixture is covered to minimize evaporation and incubated for 30 min. After incubation, the substrate is washed using 5× SSPE/T. A second wash is performed using 5×SSC/T.

The solid phase PCR amplification on the patterned substrate can be accomplished by multiple options. In a first option, the following ingredients are mixed in a 1.5 mL tube: deionized water—31 µL; 5× High Fidelity (HF) buffer—10 µL; PEG solution (30% w/v, Mw~20000)-7 µL; dNTP [25 mM]-1 µL and Linear DNA Template—0.5 µL; Fusion (Hot-start) high fidelity polymerase—0.5 µL. The total mixture has a total volume of 50 µL and is dispensed on top of the substrate with the primers attached from above to immerse patterned area surface with the mixture. The substrate and mixture is covered tightly (chambered with 5M NaCl) to minimize evaporation and heated to 95° C. 5 sec, 50° C. 30 sec, and then 72° C. 120 sec. After the thermal treatment, the substrate is washed by immersing the substrate in 50% formamide (at 55° C.). A second wash is performed using 50% formamide/2× SSPE_T (at 55° C.). A third wash is performed using 2× SSPE_T at 55° C. A fourth wash is performed using 1× HF buffer with 5% w/v PEG (Mw~20000). The BS 3 solution is made without the linear DNA template and then dispensed on top of the substrate. The substrate and mixture is covered tightly (chambered with 5M NaCl) to minimize evaporation and thermal-cycled 30 times with each cycles' temperature profile being (95° C. 5 sec, 50° C. 20 sec, 72° C. 60 sec). After thermal-cycling, the substrate is washed by immersing the substrate in 5×SSC/T. A second wash is performed using 5× SSPE/T. A third wash is performed using 1×TE buffer. Uracil cleavage solution is prepared by mixing 1 µL of USER enzyme with 49 µL of 1×TE buffer. The uracil cleavage solution is dispensed on top of the substrate. The substrate and mixture is covered tightly (chambered with 5M NaCl) to minimize evaporation and incubate at 37° C. for 30 min. After incubation, the substrate is washed by immersing the substrate in 50% formamide (at 55° C.). A second wash is performed using 50% formamide/2× SSPE_T (at 55° C.). A third wash is performed using 2× SSPE_T at 55° C. A fourth wash is performed using 5× SSPE/T at room temperature.

In a second option, Solid-Phase PCR amplification on the surface of patterned substrate is accomplished by Option B. The linear DNA template is denatured in 0.01N NaOH (54). The above solution is neutralized by adding 45 µL of 10× SSPE/T. This mixture (50 µL) is dispensed on top of the substrate with the primers attached to immerse patterned area surface with the mixture. The substrate and mixture is sealed tightly to minimize evaporation and heated to 60° C. for 5 min.

After incubation, the substrate is washed by immersing the substrate in 50% formamide (at 60° C.). A second wash is performed using 50% formamide/2× SSPE_T (at 60° C.). A third wash is performed using 2× SSPE_T at 60° C. A fourth wash is performed using 1× HF buffer with 5% w/v PEG (Mw~20000).

In a 1.5 mL tube, the following ingredients are mixed: deionized water—31.5 μL; 5× High Fidelity (HF) buffer—10 μL; PEG solution (30% w/v, Mw~20000)—7 μL; dNTP [25 mM]—1 μL and Fusion (Hot-start) high fidelity polymerase—0.5 μL. The total solution volume is 50 μL. This mixture (50 μL) is dispensed on top of the substrate to immerse patterned area surface with the mixture. The substrate and mixture is incubated at 60° C. for 1 min. Starting with the first wash in 50% formamide at 60° C. (start of previous paragraph) and ending with the incubation of the substrate and mixture at 60° C. for 1 min, the method is repeated 25-30 times.

The substrate is washed by immersing the substrate in 5×SSC/T. A second wash is performed using 5× SSPE/T. A third wash is performed using 1×TE buffer. Uracil cleavage solution is prepared by mixing 1 μL of USER enzyme with 49 μL of 1×TE buffer. The uracil cleavage solution is dispensed on top of the substrate. The substrate and mixture is incubated at 37° C. for 30 min. After incubation, wash substrate by immersing the substrate in 50% formamide at 60° C. A second wash is performed using 50% formamide/2× SSPE_T (at 60° C.). A third wash is performed using 2× SSPE_T at 60° C. A fourth wash is performed using 5× SSPE/T at room temperature.

To hybridize fluorescent primer on immobilized sequencing features by solid-phase PCT, 2 μL of 5Cy3_Hyb_Oligo (10 μM) is mixed with 48 μL of fresh 5×SSC/T. Dispense this mixture (50 μL) on top of the substrate with the sequencing features created from above (options A or B). The substrate with the fluorescent probe solution is incubated at 37° C. for 15 min and at room temp for 15 min. After incubation, the substrate is washed by immersing the substrate in 5×SSC/T. A second wash was performed using 5× SSPE/T. The substrate is imaged using epi-fluorescent microscopy. A successful attachment and subsequent fluorescent primer hybridization will produce bright individual bead-like structures attached according to the ordered pattern on the substrate when viewed under the microscope.

Sequencing Reaction on Ordered DNA Sequencing Array Constructed Using Solid-Phase Amplification.

The sequencing by ligation (SBL) reaction mixture is prepared by mixing the following ingredients: deionized water—19 μL; 2× ligation buffer—25 μL; Sequencing Primer [100 μM]—μL; Nonamer mix [25 μM]—4 μL, and Rapid Ligase—1 μL. The total solution volume is 50 μL.

The sequencing substrate is washed with 1× ligation buffer. Then, 50 μL of the sequencing mixture is dispensed on top of the substrate. The substrate is incubated with mixture at room temp for 15 min and at 37° C. for 15 min. After incubation, the substrate is washed using 5×SSC/T. A second wash was performed using 5×SSPE/T. The substrate is imaged using epi-fluorescent microscopy. A successful solid-phase amplification to generate clonal sequencing features and subsequent fluorescent sequencing reaction will produce bright individual bead-like structures attached according to the ordered pattern on the substrate when viewed under the microscope and imaged at emission filters corresponding to the fluorophores from the sequencing mix.

Example 9

High-Density Order Array Construction for Single Molecule DNA Sequencing (Method 4)

Materials:
Patterned substrates from either Example 1 or 2
Linear DNA template type 1

(Sequence: 5'-agctNNNNNNNNNNNNNNNNNNNNNNNNNNNNNN
NNgatctcggtggtcgccgtatcatt (SEQ ID NO: 8))

Linear DNA template type 2

(Sequence: 5'-agctNNNNNNNNNNNNNNNNNNNNNNNNNNNNNN
NNAAAAAAAAAAAAAAAAAAAAAA (SEQ ID NO: 9))

5'-Amino-surface Primer forward type1 (5NH2_SP_F_1)

(sequence: 5'-NH2-TTT TTT AATGATACGGCGACCACCGAGA
TC-3' (SEQ ID NO: 6))

5'-Amino-surface Primer forward type 2 (5NH2_SP_F_2)

(sequence: 5'-NH2-TTT TTT AAT^GATACG^GCGA^CCACCG
A^GATC-3' (SEQ ID NO: 10))
(^denotes locked nucleic acid)

(^denotes locked nucleic acid)
5'-Amino-surface Primer forward type3 (5NH2_SP_F_3)

(sequence: 5'-NH2-TTT TT^T TTT T^TT TTT TTT^ TTT
TTT T^TT TTT-3') (SEQ ID NO: 11)
(^denotes nucleic acid)

Bis(Sulfosuccinimidyl) suberate (BS3) crosslinker
PEG solution (30% w/v, Mw~20000)
PBS
1×TE buffer
0.005N NaOH
5× Sodium Chloride Sodium Phosphate with 50 mM EDTA and 0.1% Tween20 (SSPE/ET)
5× Sodium Chloride Sodium Phosphate with 0.1% Tween20 (SSPE/T)
10×SSPE/T
5× Sodium Chloride Sodium Citrate with 0.1% Tween20 (SSC/T)

Procedure:

In order to attach the forward (sequencing) primer onto patterned substrate, a BS3 solution was prepared by resuspending 2 mg of BS3 with 1 mL of PBS. 0.5 μL of BS3 solution, 39.5 μL of 5NH2_SP_F [1 nM] solution and 10 μL of PEG solution were mixed and gently vortexed. This mixture was immediately dispensed on top of the patterned substrate to immerse patterned area surface with the mixture. The substrate and mixture were covered to minimize evaporation and incubated for 30 min. After incubation, the substrate was washed by immersing the substrate in 5× SSPE/T. A second wash was performed using 5×SSC/T.

Single DNA template hybridization onto the patterned substrate with primers attached was accomplished as follows. The linear DNA template was denatured in 0.005N NaOH (5

μL). The solution was neutralized by adding 45 μL of 10× SSPE/T and then adding 10 μL of PEG solution. This mixture (60 μL) was dispensed on top of the substrate with the primers attached to immerse patterned area surface with the mixture. The substrate and mixture were sealed tightly to minimize evaporation and heated to 60° C. for 5 min. After incubation, the substrate was washed by immersing the substrate in 5×SSC/T. A second wash was performed using 5× SSPE/T.

Fluorescent Single Base Extension (SBE) on Hybridized Single Molecule Sequencing Features.

Figure 14:
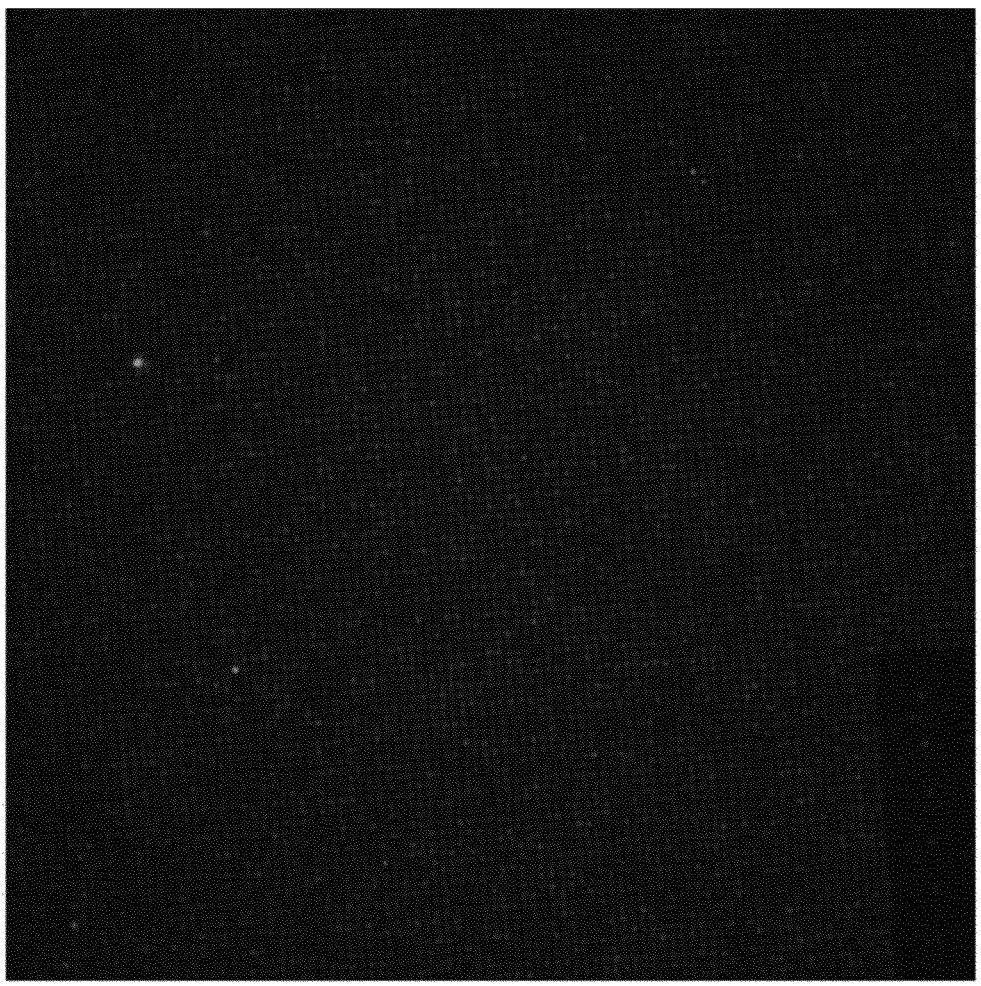
FIG. 14 illustrates successful attachment and subsequent fluorescent emission corresponding to the labeled nucleotide complementary to the first adjacent base to the 3-prime priming site.

SBE reaction mixture was prepared by mixing: deionized water—43.5 μL; 10×Thermosequenase buffer—5 μL; ddNTP-cy3 [1 μM]—1 μL, and Thermosequenase (2 U/μL)—0.5 μL. The total mixture volume was 50 μL, and was dispensed on top of the substrate with the sequencing features created from above. The substrate was incubated with the SBE solution at 62° C. for 15 min and at room temperature for 5 min. After incubation, the substrate was washed by immersing the substrate in 5×SSC/T. A second wash was performed using 5× SSPE/ET. The substrate was imaged using epi-fluorescent (oil-immersion 100×/1.25NA lens) microscopy. A successful attachment and subsequent fluorescent SBE produced fluorescent emission corresponding to the labeled nucleotide complementary to the first adjacent base to the 3-prime priming site. In this example, ddNTPs were labeled with the fluorophore Cy3. As shown in FIG. 14, fluorescence signals were present in those spots corresponding to the ordered pattern on the substrate when viewed under the microscope and imaged at emission filters corresponding to the fluorophores from the SBE mix.

Sequencing Reaction on Ordered Single Molecule DNA Sequencing Array.

Sequencing by ligation (SBL) reaction mixture was prepared by combining: deionized water—23 μL; 2× ligation buffer—25 μL; 4 color fluorescent nonamer (query position 2) mix [10 μM]-1 μL, and Rapid Ligase—1 μL. The total mixture had a volume of 50 μL.

Figure 15:
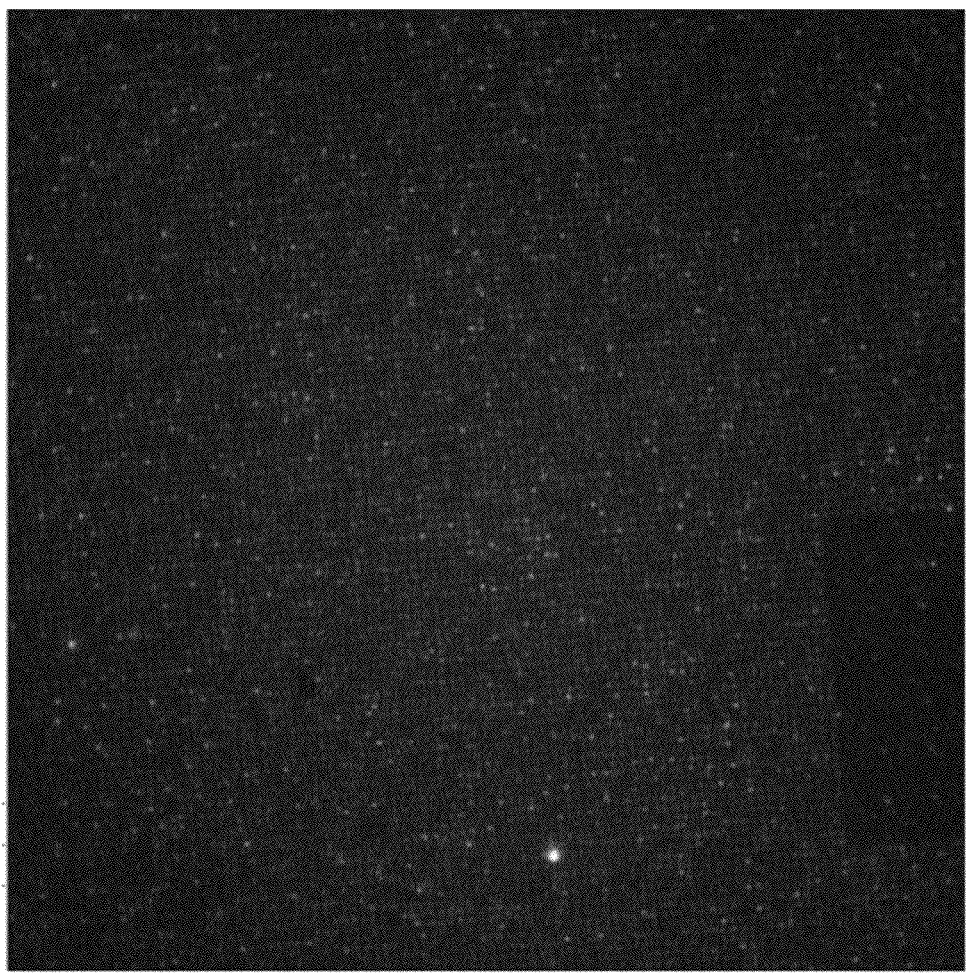
FIG. 15 illustrating fluorescence in spots corresponding to the ordered pattern of the substrate.

The sequencing substrate was washed with 1× ligation buffer. Then, 50 μL, of the sequencing mixture was dispensed on top of the substrate. The substrate was incubated with the sequencing mixture at room temp for 15 min and at 37° C. for 15 min. After incubation, the substrate was washed using 5×SSC/T. A second wash was performed using 5× SSPE/ET. The substrate was imaged using epi-fluorescent (oil-immersion 100×/1.25NA lens with filter sets corresponding to each of the fluorophores) microscopy. A successful single DNA molecule attachment to generate sequencing features and subsequent fluorescent sequencing reaction produced fluorescent emission corresponding to the labeled oligonucleotide probe complementary to the template querying the $2^{nd}$ base off of the priming site. As shown in FIG. 15, fluorescent signals were present in only those spots corresponding to the ordered pattern on the substrate when viewed under the microscope and imaged at emission filters corresponding to the fluorophores from the sequencing mix.

As can be seen in sequencing reactions described above on variously prepared ordered DNA sequencing arrays, any available sequencing chemistry can be used to carry out specific secondary reporter incorporation for detection. In the examples above sequencing by ligation using fluorescent oligo probes is used for verifying clonal sequencing features arranged in high-density, ordered patterns. Other sequencing chemistries such as sequencing by synthesis (SBS) using fluorescent reversible terminators as well as pyrosequencing can be used when proper detection system is used in combination with the chemistry.

Example 10

Direct Detection with Universal Substrate

Figure 13:
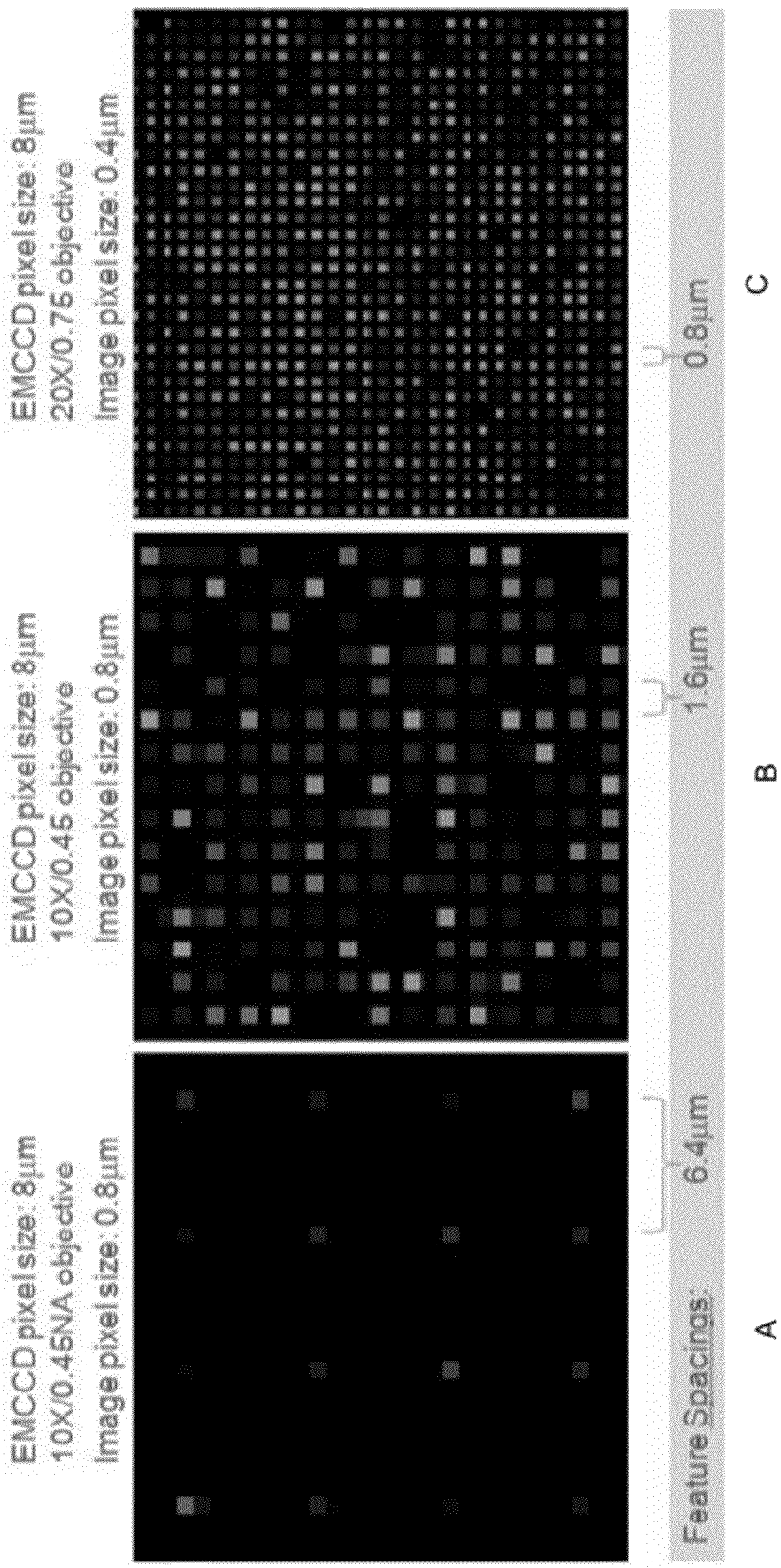
FIG. 13 are fluorescence images illustrating attachment of biomolecules to be able to align to pixels on a sensor.

A patterned substrate was fabricated using deep UV photolithography, as described in Example 1. The pattern consisted of 240 nm round spots, which were subsequently treated to provide site-specific attachment functionality, and were spaced at various different pitches (6.4 μm, 1.6 μm and 0.8 μm) mimicking CMOS sensor pixel size/pitch. Once the patterned substrate was activated for biomolecule attachment as described in Example 3, a solution containing rolling circle amplification (RCA) products was incubated on top of the patterned substrate surface. The individual RCA products site-specifically attached to the patterned spots and subsequently fluorescent primers complementary to portions of the RCA products were hybridized. The fluorescence signal from the RCA products were then detected using epi-fluorescence microscopy equipped with EMCCD camera. The camera had pixel size of 8 nm, and Nikon objective lens (10× and 20×) were used to vary the image pixel size. As can be seen in FIG. 13, attachment spots for biomolecules were precisely patterned using photolithography to match and be aligned to the pixel pitch/s of the sensor. FIG. 13A example has 6.4 μm spacing between features, an image pixel size of 0.8 μm and the lens was a 10×/0.45NA objective. FIG. 13B example has 1.6 μm spacing between features, an image pixel size of 0.8 μm and the lens was a 10×/0.45 objective. FIG. 13C example has 0.8 μm spacing between features, an image pixel size of 0.4 μm and the lens was a 20×/0.75 objective. As shown, reporting signal from the attached biomolecules can be clearly detected with a single pixel from the sensor. Further optimization and characterization of size and distance relationship between sensing component and biomolecule attachment site as well as surface material will enable one to easily design any CMOS sensor into a modified CMOS chip capable of achieving high-throughput and high sensitive detection once complementary reporting signal generation strategies can be effectively integrated.

The description herein has been presented for the purpose of illustration; it is not intended to be exhaustive or to limit the invention to the precise forms disclosed. Persons skilled in the relevant art can appreciate that many modifications and variations are possible in light of the teachings.

It should be noted that the language herein has been principally selected for readability and instructional purposes, and it may not have been selected to delineate or circumscribe the inventive subject matter. Accordingly, the disclosure is intended to be illustrative, but not limiting, of the scope of the invention.

Any terms not directly defined herein shall be understood to have the meanings commonly associated with them as understood within the art of the invention. Certain terms are discussed herein to provide additional guidance to the practitioner in describing the compositions, devices, methods and the like of aspects of the invention, and how to make or use them. It will be appreciated that the same thing may be said in more than one way. Consequently, alternative language and synonyms may be used for any one or more of the terms discussed herein. No significance is to be placed upon whether or not a term is elaborated or discussed herein. Some synonyms or substitutable methods, materials and the like are provided. Recital of one or a few synonyms or equivalents does not exclude use of other synonyms or equivalents, unless it is explicitly stated. Use of examples, including examples of terms, is for illustrative purposes only and does not limit the scope and meaning of the aspects of the invention herein.

All references, issued patents and patent applications cited within the body of the specification and appendix are hereby incorporated by reference in their entirety, for all purposes.

The invention claimed is:

1. A patterned substrate comprising a substrate comprising a plurality of first regions and a second region wherein: the plurality of first regions have a density on the substrate between $5 \times 10^6$ and $25 \times 10^6/mm^2$ and an associated biomolecule specifically located at each of said plurality of first regions and a complementary metal-oxide semiconductor (CMOS) sensor specifically located at each of said plurality of first regions.

2. The substrate of claim 1 wherein the associated biomolecule is a polynucleotide.

3. The substrate of claim 2 wherein the polynucleotide is clonally amplified.

4. The substrate of claim 1 wherein the associated biomolecule is a polypeptide.

5. The substrate of claim 1 further comprising a polymer attached to the second region.

6. The substrate of claim 3 wherein the clonally amplified polynucleotides attached to each of the plurality of first regions are different.

7. The substrate of claim 1 wherein each of the plurality of first regions are coupled to a CMOS pixel.

8. The substrate of claim 1 wherein the density is between $6 \times 10^6$ and $10 \times 10^6$ sequencing features/mm$^2$.

9. A method for building a patterned substrate comprising:
provinding a substrate comprising a plurality of complementary metal oxide semiconductor (CMOS) sensors at a density of between $5 \times 10^6$ and $25 \times 10^6$/mm$^2$;
etching a well onto the substrate at each CMOS sensor;
coating the plurality of wells with a first coating; and
associating a biomolecule to each of the plurality of wells.

10. The method of claim 9 wherein the biomolecule comprises a polynucleotide.

11. The method of claim 9 wherein the biomolecule comprises a polypeptide.

12. The method of claim 10 wherein associating a polynucleotide to the plurality of wells to comprises:
attaching a universal primer to each of the plurality of wells;
hybridizing a circular DNA template onto each universal primer; and
performing solid-phase rolling circle amplification.

13. The method of claim 10 wherein associating a polynucleotide to the plurality of wells comprises:
attaching universal forward and reverse primers to each of the plurality of wells;
hybridizing DNA template onto one of the forward or reverse primer; and
performing solid-phase bridge amplification.

14. The method of claim 10 wherein associating a polynucleotide to the plurality of wells comprises:
attaching universal primer to each of the plurality of wells; and
hybridizing the polynucleotide comprising a DNA template to the universal primer.

15. The method of claim 10 wherein associating a polynucleotide to the plurality of wells comprises clonally amplifying the polynucleotide.

16. The method of claim 10 wherein the polynucleotide is a single DNA template.

17. The method of claim 10 wherein associating a polynucleotide to the plurality of wells comprises a self-assembling process.

18. The method of claim 9 wherein the density is between $6 \times 10^6$ and $10 \times 10^6$ sequencing features/mm$^2$.

* * * * *